United States Patent [19]
Opower et al.

[11] Patent Number: 5,818,546
[45] Date of Patent: Oct. 6, 1998

[54] APPARATUS FOR IMAGING EXIT SPOTS OF A LASER ARRAY

[75] Inventors: Hans Opower, Krailling; Uwe Becker; Uwe Brauch, both of Stuttgart, all of Germany

[73] Assignee: Deutsche Forschungsanstalt fuer Luft -und Raumfahrt e.V., Germany

[21] Appl. No.: 512,056

[22] Filed: Aug. 7, 1995

[30] Foreign Application Priority Data

Aug. 9, 1994 [DE] Germany .......................... 44 28 202.8

[51] Int. Cl.$^6$ ................. H04N 9/31; H04N 3/08; G02F 1/00
[52] U.S. Cl. ................ 348/750; 348/756; 348/203; 347/232; 347/243; 353/31
[58] Field of Search .................. 348/750, 756, 348/758, 195–205; 353/31; 347/130, 131, 132, 232, 233, 243, 244, 258, 259, 260, 261; H04N 9/31, 5/94, 9/14, 3/08

[56] References Cited

U.S. PATENT DOCUMENTS

| | | |
|---|---|---|
| 4,297,723 | 10/1981 | Whitby . |
| 4,805,012 | 2/1989 | Agostinelli et al. . |
| 4,978,202 | 12/1990 | Yang ........................................ 348/761 |
| 4,979,030 | 12/1990 | Murata ..................................... 348/750 |
| 5,317,348 | 5/1994 | Knize ...................................... 348/750 |
| 5,424,771 | 6/1995 | Yu ............................................. 348/760 |
| 5,463,468 | 10/1995 | Takanaski et al. ....................... 348/195 |
| 5,614,961 | 3/1997 | Gibeau et al. ........................... 348/750 |

FOREIGN PATENT DOCUMENTS

| | | |
|---|---|---|
| 0 458 270 | 11/1991 | European Pat. Off. . |
| 2 577 371 | 8/1986 | France . |
| 2 252 472 | 8/1992 | United Kingdom . |
| WO 94/18802 | 8/1994 | WIPO . |

*Primary Examiner*—Michael Lee
*Attorney, Agent, or Firm*—Barry R. Lipsitz

[57] ABSTRACT

In order to improve an apparatus for generating an image in an image plane that is visible, in particular, for a human eye, comprising a radiation source which generates an image via an optical projection means by building up at least one row of image spots during an image build-up cycle by illuminating individual, adjacently located image spots and periodically repeating the image build-up cycle, so that it is possible to generate images as simply and, therefore, also as inexpensively as possible, it is suggested that a row of light sources comprising a plurality of semiconductor emitters be provided for the illumination of the image spots of the row of image spots, that the optical projection means associate each exit spot for the radiation of each semiconductor emitter with at least one of the image spots and that the optical projection means simultaneously image the exit spots of all the semiconductor emitters of the row of light sources onto the image spots associated therewith.

66 Claims, 19 Drawing Sheets

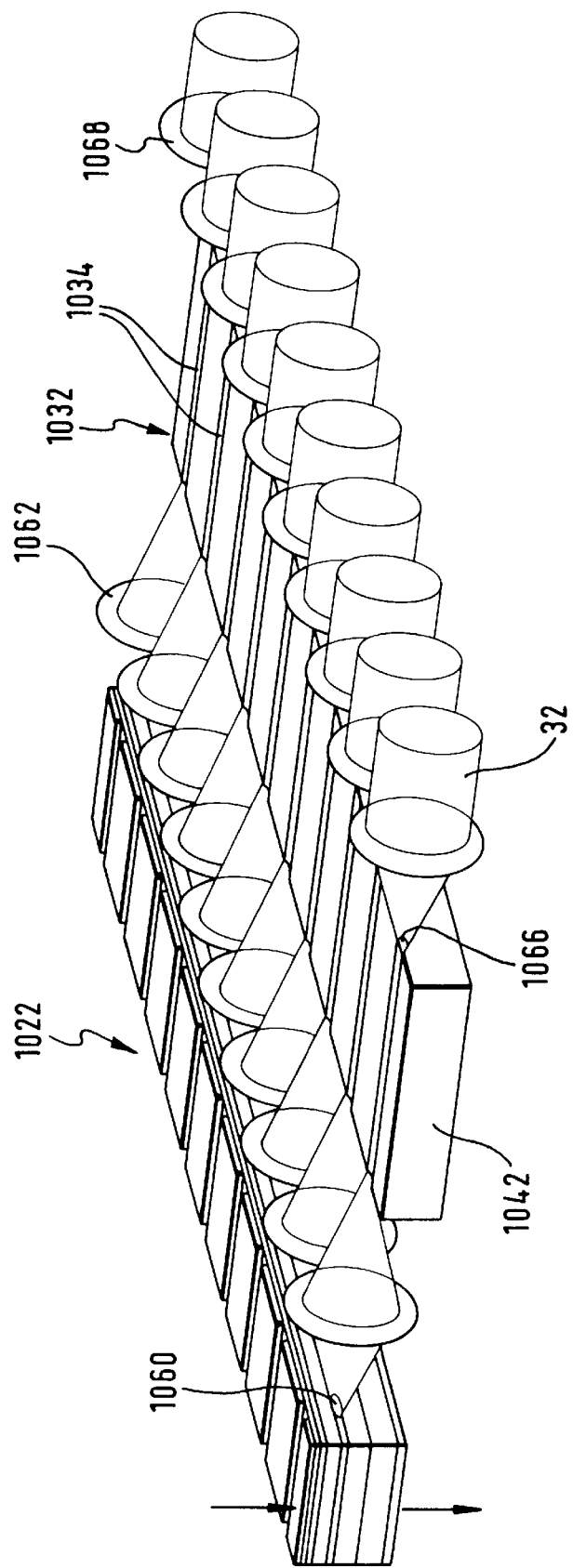

APPARATUS FOR IMAGING EXIT SPOTS OF A LASER ARRAY

BACKGROUND OF THE INVENTION

The invention relates to an apparatus for generating an image in an image plane that is visible, in particular, for a human eye, comprising a radiation source which generates an image via an optical projection means by building up at least one row of image spots during an image build-up cycle by illuminating individual, adjacently located image spots and periodically repeating the image build-up cycle.

The inventive apparatus serves, for example, to generate not only static but also moving images, such as, for example, television pictures, which have a large format and, where applicable, are also multicolored.

An apparatus of this type is known, for example, from DE-A-23 41 705, whereby with this type of apparatus the images are generated by means of gas lasers and a laser beam from a gas laser is moved over the optical projection means to generate an image which is recognizable for the human eye as a whole and consists of individual image dots.

The use of such gas lasers for generating images requires considerable resources with respect to apparatus for generating the laser beam and, moreover, considerable resources with respect to the optical projection means in order to deflect the laser beam in a defined manner.

The object underlying the invention is, therefore, to improve an apparatus of the generic type such that it is possible to generate images as simply and, therefore, also as inexpensively as possible.

SUMMARY OF THE INVENTION

This object is accomplished in accordance with the invention, in an apparatus of the type described at the outset, in that a row of light sources comprising a plurality of semiconductor emitters is provided for the illumination of the image spots of the row of image spots, that the optical projection means associates each exit spot for the radiation from each semiconductor emitter with at least one of the image spots and that the optical projection means simultaneously images the exit spots of all the semiconductor emitters of the row of light sources onto the image spots associated therewith.

The advantage of the inventive solution is to be seen in the fact that, on the one hand, the semiconductor emitters represent a radiation source which is of a simple construction and easy to operate and that, on the other hand, the designated plurality of semiconductor emitters of the row of light sources simplifies the optical projection means insofar as this can image all the semiconductor emitters of the row of light sources simultaneously onto the image spots associated therewith so that, proceeding from, for example, 100 image build-up cycles per second, the demands placed on the optical projection means are less.

This solution proves to be particularly advantageous when it is assumed that the image, in order to be visible as a whole for the human eye, must be built up within at least the period of time customary for television sets and must be repeated at at least the repetition frequencies customary for television sets.

In this respect, it is possible, for example, to select the number of semiconductor emitters such that the optical projection means illuminates one section of the image spots of a row of image spots at one point in time and another section at a later point in time.

Within the meaning of the invention, a row can extend horizontally or vertically.

From a purely theoretical point of view, it would be conceivable to illuminate an image spot with several semiconductor emitters each emitting light of the same wavelength. The inventive apparatus is, however, particularly economical when the optical projection means—in particular for the semiconductor emitters radiating at the same wavelength—also associates different exit spots with different image spots of the row of image spots during the image build-up cycle.

In addition, it would also be conceivable to associate the image spots with the exit spots in different ways during different image build-up cycles. However, the construction of the optical projection means is particularly simple when the same exit spots are associated with the same image spots of the row of image spots during each image build-up cycle.

The number of semiconductor emitters could be selected such that one semiconductor emitter is associated with each image spot. However, in order to limit the number of semiconductor emitters which are arranged next to one another in the smallest of spaces, it is advantageous for the number of semiconductor emitters to be smaller than the total number of image spots of the row of image spots and for the optical projection means to image the exit spots onto various series of image spots of the row of image spots at consecutive points of time during the image build-up cycle. This means, in particular, that the plurality of semiconductor emitters serves, first of all, during the image build-up cycle to illuminate one section of the image spots of the row of image spots, in this case designated as series of image spots, and that during the image build-up cycle the complete illumination of the row of image spots results from the individual series of image spots being illuminated one after the other in time, whereby, when this is done quickly, the human eye sees the row of image spots as being continuously illuminated.

With respect to the arrangement of the image spots forming a series of image spots, different possibilities are conceivable. In one advantageous embodiment, for example, the optical projection means images the exit spots of the row of light sources onto a respective series of image spots of the row of image spots at each of the consecutive points of time during the image build-up cycle and the series of image spots is formed by a set of immediately adjacent image spots. This means that image spots located respectively adjacent to one another are combined to form one set and that the total illumination of the row of image spots results by illuminating several sets one after the other during the image build-up cycle.

In principle, this could result from one image spot also being part of several sets so that a multiple illumination of each image spot results during one image build-up cycle. It is, however, particularly simple for each image spot of the row of image spots to be respectively comprised by one set of image spots so that the illumination of an image spot of the row of image spots takes place only once in conjunction with the illumination of a set.

Furthermore, it is, in principle, conceivable to arrange the sets of image spots such that these comprise different sections of the row of image spots which are not necessarily correlated with one another.

It is, however, particularly advantageous for the optical projection means to place the sets of image spots in the row of image spots such that chronological sets of image spots immediately follow one another.

Alternatively to illuminating the row of image spots in the form of sets of image spots, it is provided for the optical projection means to image adjacently located exit spots of the row of light sources onto a series of image spots designed as an image spot pattern having an image spot pattern spacing which amounts each time to a specific multiple of the distance between adjacently located image spots of the image. This is preferably an integral multiple of the distance between adjacently located image spots of the image.

In order, for this purpose, to bring the radiation from adjacently located semiconductor emitters into a spacing which corresponds, after projection by the optical projection means, to the image spot pattern spacing in the row of image spots, it is advantageously provided for the apparatus to comprise an optical spreading or extending means which images the distance between adjacently located exit spots of the row of light sources onto a pattern spacing which results in the image spot pattern spacing in the image following projection by the optical projection means.

This optical spreading means can be designed in the most varied of ways.

Preferably, the optical spreading means enlarges the distance between adjacently located exit spots of the row of light sources to the pattern spacing.

For this purpose, it is preferable for the optical spreading means to image the beam bundles exiting from the exit spots onto parallel beam bundles extending in the pattern spacing relative to one another.

The optical spreading means can, itself, be constructed from the most varied of elements. In an advantageous embodiment, for example, the optical spreading means comprises a plurality of prism elements, which are entered by the radiation of the individual semiconductor emitters coming from the row of light sources and the prism elements generate beam bundles exiting from the optical spreading means which have the pattern spacing from one another.

Alternatively to providing prism elements, the optical spreading means comprises a reflection grating, the reflection surfaces of which have the specific pattern spacing in the direction of incidence of the radiation coming from the semiconductor emitters and, therefore, already reflect the radiation in the pattern spacing.

In a further, alternative possibility for the construction of the optical spreading means, the optical spreading means comprises a light guide for each of the exit spots, the radiation from the respective exit spots of the semiconductor emitters enters the light guides at one end and the light guides define with the other end light guide exit spots arranged in the predetermined pattern spacing.

In the simplest case, the optical spreading means can be constructed such that light guide paths arranged on a substrate are provided as light guides.

With respect to the optical projection means, no further details have so far been given. It would, for example, be possible for the optical projection means to image the exit spots onto the various series of image spots at statistically varying intervals during the image build-up cycle of the row of image spots. It is, however, particularly advantageous, in order to achieve an optimum illumination of the individual image spots with the lowest possible power of the semiconductor emitters, for the optical projection means to image the exit spots of the row of light sources successively onto various series of image spots one after the other in order to generate the row of image spots and, thus, keep the dead times between the illumination of individual series of image spots as slight as possible.

From a constructional point of view, this may be realized in the simplest way by the optical projection means comprising a beam deflecting element which images the row of light sources onto the consecutive series of image spots.

The beam deflecting element can be designed in the most varied of ways. This can, for example, be a prism or a lens which is movable. It is, however, particularly advantageous for the beam deflecting element to be a movable reflection element.

For this purpose, it is constructionally provided in a simple way for the reflection element to be movable into defined angular positions which image the row of light sources onto a respective one of the series of image spots.

The simplest way to accomplish this from a constructional point of view is for the beam deflecting element to be formed by a mirror pivotable about an axis.

This mirror can be constructed such that it moves continuously during an image build-up cycle.

Alternatively thereto it is provided for the mirror to pass through individual, defined positions during the image build-up cycle, i.e. to be brought into individual, defined positions, for example by a stepping motor control or a control by means of piezoelectric elements or the like.

So far, the description of the inventive solution has merely been based on the build-up of one row of image spots from different series of image spots since this is the simplest case of the inventive solution. It is, however, particularly advantageous for the optical projection means to build up the image from a plurality of adjacently located rows of image spots during the image build-up cycle and therefore build up a two-dimensional image, such as, for example, a television picture.

For this purpose, it is particularly expedient for the optical projection means to generate the image spots of one series of image spots in each row of image spots and then generate the next series of image spots in each row of image spots so that, first of all, the one series of image spots is generated in each row of image spots and then the next series of image spots in each row of image spots.

For this purpose, it is preferable for the optical projection means to comprise a beam deflecting element which generates the series of image spots in consecutive rows of image spots, whereby the beam deflecting element is, in particular, a movable reflection element or a movable lens or a movable prism.

The beam deflecting element is expediently movable into defined positions which generate the series of image spots in each of the rows of image spots.

In a particularly advantageous solution, the beam deflecting element is formed by a polygonal mirror rotating about an axis of rotation.

The polygonal mirror is preferably constructed such that it reflects the radiation coming from the row of light sources with each polygonal surface such that this radiation traverses the number of adjacently located rows of image spots by rotation in a predetermined angular range and then proceeds to the next polygonal surface.

In a particularly expedient embodiment of the inventive solution, the polygonal mirror has mirror surfaces which are respectively inclined by a different angle in relation to a parallel line to the axis of rotation so that each mirror surface generates a series of image spots in all the rows of image spots of the image and then after proceeding to the next mirror surface the next series of image spots is generated in all the rows of image spots of the image.

A successive projection of the row of light sources onto a plurality of rows of image spots can be realized with an inventive polygonal mirror particularly easily when the polygonal mirror rotates at a constant rotational speed.

In this respect, it is preferable for the polygonal mirror to reflect the radiation coming from the row of light sources with each polygonal surface such that this radiation traverses the number of rows of image spots by rotation in a predetermined angular range and then proceed to the next polygonal surface.

The image can be generated particularly advantageously with a beam deflecting element when the optical projection means focuses the radiation from the semiconductor emitters of the row of light sources essentially onto the beam deflecting element.

In all the embodiments, in which a plurality of rows of image spots are generated from a row of light sources by the optical projection means, it is advantageous for a period of time of at least 10 $\mu s$ to be available for illuminating the image spots of a row of image spots.

In the case where all the semiconductor emitters associated with the image spots of a row of image spots are controlled simultaneously, this means that the time intervals between two control points of time are likewise at least 10 $\mu s$. If only the semiconductor emitters associated with one section of the image dots are controlled at the same time, this number is multiplied by the fraction of the image spots of the row of image spots which are simultaneously illuminated. In the case of at least one tenth of the image dots, at least 1 $\mu s$ is available as interval between two control points of time.

Alternatively to the case where the optical projection means images a row of light sources successively onto a plurality of rows of image spots, it is possible for one row of light sources to be associated with each row of image spots.

In this case, the optical projection means is designed such that it images the plurality of rows of light sources onto the plurality of rows of image spots.

Quite generally, no further details have been given regarding the nature of the projection quality of the optical projection means. In an advantageous embodiment, for example, the optical projection means generates image spots having small distances from one another by enlarging the exit spots in longitudinal direction of the row of image spots.

In this respect, it is preferable for the image spots to border essentially on one another.

It is particularly expedient in the inventive solution for the semiconductor emitters to emit the radiation in the period of time between two consecutive control points of time. The advantage of this is to be seen in the fact that, in contrast to the apparatuses known from the state of the art, not only can a short illumination of an image dot take place at a single point of time but, due to the fact that the optical projection means associates the plurality of semiconductor emitters with the image spots, it is possible to illuminate the image spots during the entire time of association.

For reasons of control, it is particularly expedient for the control points of time to succeed one another at constant time intervals.

In this respect, an advantageous embodiment provides for the semiconductor emitters to emit the radiation with a variably adjustable intensity in order to illuminate the image spots in accordance with the adjustable intensity.

With this variation it has proven to be expedient for the semiconductor emitters to emit the radiation with the adjusted intensity essentially unaltered between two control points of time.

For this purpose, it is favorable for the intensity of the radiation from each semiconductor emitter to be adjusted at each control point of time and, in particular, for an alteration of the intensity setting to be possible at the next control point of time.

This solution has the great advantage that the entire period of time between two consecutive control points of time is available for illuminating the image spots associated with the exit spots of these semiconductor emitters so that an essentially lower power of the individual semiconductor emitter is sufficient to achieve a certain illumination of an image dot for the time-averaging human eye, in contrast to the solutions known from the state of the art, in which a very short space of time is available, due to the jumping from image spot to image spot, for illuminating this image spot and attaining a desired intensity observed by the human eye when averaged over time.

Alternatively to this, it is provided for the semiconductor emitters to emit between the control points of time either the radiation with a maximum intensity but a variably adjustable duration or no radiation. This type of control of the semiconductor emitters has the advantage that a simple mode of operation suitable, in particular, for the operation of semiconductor emitters, is thereby possible.

In an embodiment of this type, an average intensity which is perceptible to a human observer can, in particular, be adjusted by modulating the duration of the emission of the radiation.

The duration of the emission of the radiation is preferably adjusted at each control point of time so that the intensity perceived on average by a human observer can be constantly and varyingly adjusted.

In this embodiment, as well, the advantage is to be seen in the fact that a considerably greater period of time is available for the illumination since, in the maximum case, the entire period of time between two control points is available for attaining the desired average intensity.

No further details have so far been given with respect to the illumination of the image spots by the semiconductor emitters. In the simplest case, for example, it is provided for each image spot to be illuminated by a single semiconductor emitter. However, only a monochrome image can be generated thereby.

In order to be able to generate a multicolored image, it is preferable for each image spot to be illuminated by three semiconductor emitters, each of which emits radiation at such a wavelength that white light can be generated by superimposing the radiation from the three semiconductor emitters.

For example, an impression of color perceptible to the human eye is generated by an arbitrary mixing of three basic colors, such as, in particular, blue, green and red. This means that not only can multicolored, static images be generated with the inventive apparatus but also multicolored, moving images.

With respect to control in the case of three semiconductor emitters illuminating one image spot, it is preferable for the three semiconductor emitters respectively illuminating one image spot to be controllable simultaneously in order to ensure that the desired color is always recognizable in the illuminated image spot.

No further details have thereby been given with respect to the design of the row of light sources. For example, independent of the question as to whether an image spot can be illuminated by one or by three semiconductor emitters, it is advantageous for the row of light sources to have at least one row of semiconductor emitters which emit radiation of the same wavelength since such a row of light sources can be produced particularly simply, for example, by a so-called "array" of semiconductor emitters.

In the case where a multicolored image is intended to be generated, it is advantageous for the illumination of the image spots of one row of image spots when the corresponding row of light sources comprises three rows of semiconductor emitters extending parallel to one another, whereby the semiconductor emitters of each row emit radiation of essentially the same wavelength. Such a combination of semiconductor emitters which emit radiation of the same wavelength is likewise advantageous for the reason that it can be produced in the form of a so-called "array".

No further details have so far been given regarding the type of control for the semiconductor emitters. In an advantageous embodiment, for example, at least those semiconductor emitters of one row of light sources which are associated with one tenth of the image spots of a row of image spots can be controlled at the same control point of time. This means that a significant extension of the time for controlling the semiconductor emitters is achieved.

It is even more advantageous when at least those semiconductor emitters of each row of light sources which are associated with one third of the image spots of a row of image spots can be controlled at the same time.

It is even better when the semiconductor emitters associated with all the image spots of a row of image spots can be controlled at the same time.

It has not so far been explained in detail how the simultaneous control of several semiconductor emitters is realized. In an advantageous embodiment, for example, an intermediate store is provided for the simultaneous control of several semiconductor emitters and the control parameters for simultaneously controlling the several semiconductor emitters can be read out in parallel from this store.

For storing the control parameters, it is preferable for the intermediate store to record the control parameters for the semiconductor emitters between the control points of time.

In this respect, it is preferable for the control parameters to be read into the intermediate store serially.

The control parameters are generated, in the simplest case, by an image generator. The image generator is preferably conceived such that this generates the control parameters serially and reads them into the intermediate store.

In order to create the possibility of controlling the semiconductor emitters in a defined manner between two control points of time, it is preferable for a control to be associated with each semiconductor emitter and for this control to intermediately store the control parameter from one control point of time to the next control point of time.

Particularly when using three semiconductor emitters radiating at different wavelengths for illuminating an image spot, it is preferable for the optical projection means to combine the radiation of the three semiconductor emitters radiating at different wavelengths to form a beam bundle in order to simplify the projection.

In the solutions described in the above, it is favorable for the optical projection means to image the radiation of the three semiconductor emitters radiating at different wavelengths onto one image spot.

The radiation from the three semiconductor emitters which respectively emit at different wavelengths and determine the color of one image spot is preferably combined to form a beam bundle before impinging on the deflecting element and this beam bundle is then moved by the deflecting element from one image spot to the next.

Alternatively thereto, it is, however, also conceivable for the radiation of the three semiconductor emitters which emit at different wavelengths to impinge separately on the deflecting element and, subsequently, to be imaged onto a single image spot by the optical projection means, whereby, in this case, the optical projection means must be designed such that it images the radiation from the three semiconductor emitters onto all the image spots which are to be illuminated by them.

Alternatively thereto, it is provided for the optical projection means to image the radiation of the three semiconductor emitters radiating at different wavelengths onto three partial image spots which are not arranged so as to be congruent.

This solution is more simple insofar as the resources required for a congruent projection of the radiation having different wavelengths for generating the image spots are no longer applicable and is sufficient insofar as the partial image spots are small enough to appear to the human eye as an image spot having one color.

In this embodiment, it is advantageous for the radiation of the three semiconductor emitters which respectively emit at different wavelengths and determine the color of one image spot to impinge separately on the deflecting element so that this also deflects the radiation separately.

No further details have so far been given concerning the semiconductor emitters. Fundamentally, it is possible to use semiconductor light emitting diodes or even semiconductor emitters generating superradiation or electroluminescent elements as semiconductor emitters.

It has proven to be particularly advantageous for the semiconductor emitters to comprise semiconductor lasers.

Particularly expedient types for this purpose are so-called edge emitters since these can be produced in a simple and, in particular, inexpensive manner as so-called "arrays", i.e. rows of semiconductor emitters on one substrate. These edge emitters are also well suited for post-connected frequency multipliers.

Alternatively thereto, it is, however, also advantageous for the semiconductor emitters to be so-called vertical emitters which can likewise be arranged in a simple manner in the form of a matrix and with which a coupling of fiber optic elements, for example of frequency doublers, is, in particular, possible.

Particularly in those cases where the use of a semiconductor radiation source combined with a frequency doubler appears to be favorable for the advantageous generation of radiation of the desired wavelength, for example of the colors blue, green or red, an inventive semiconductor emitter comprises a semiconductor radiation source, in particular a semiconductor laser, and a frequency doubler for the radiation emitted by the semiconductor radiation source.

In this respect, the frequency doubler is preferably constructed such that it comprises a waveguide structure which guides in a compressed manner or compresses the radiation of each radiation source to a power density of at least $10^5$ $W/cm^2$ and a frequency doubling medium arranged in the waveguide structure.

The provision of such a waveguide structure enables the high power density necessary for the frequency doubling to be maintained in a simple manner in the frequency doubling medium over an adequate interaction length.

The frequency doubler may be arranged in the most varied of ways relative to the radiation source. In an advantageous embodiment, for example, an optical means focusing the radiation into the waveguide structure is arranged between each radiation source and each frequency doubler so that the entire radiation exiting divergingly from the radiation source is coupled into the waveguide structure.

Alternatively thereto, it is provided for each frequency doubler to directly follow the respective radiation source. In this case, it is also ensured that the radiation generated by the radiation source essentially enters the post-connected frequency doubler, in particular when its waveguide structure is adapted to the cross-sectional shape of the radiation exiting from the radiation source.

This embodiment has, in addition, the advantage that the provision and adjustment of an optical focusing means between the radiation source and the frequency doubler can be omitted.

In an expedient embodiment, the radiation sources of a row of light sources are arranged in a row and the frequency doublers of the row of light sources are likewise arranged in a row on the output side of the radiation sources, preferably with the same spacings as the radiation sources.

Preferably, the radiation sources can be produced particularly simply and inexpensively when several of the radiation sources are arranged on a common substrate.

In the same way, the frequency doublers can also be produced inexpensively when several frequency doublers are arranged on a common substrate.

In particular, a plurality of radiation sources and a plurality of frequency doublers can be ideally combined when these are respectively located on a common substrate at the same respective distances so that it is then possible to arrange the frequency doublers to directly follow the radiation sources or with an optical focusing means therebetween, whereby both the radiation source and the frequency doubler are, however, always seated on a common optical axis.

No further details have so far been given with respect to the type and design of the waveguide structure. In an advantageous embodiment, for example, the waveguide structure of each frequency doubler is a single mode waveguide.

No further details have been given in conjunction with the preceding description of individual embodiments with respect to the design of the waveguide structure itself. In an advantageous embodiment, for example, the waveguide structure is formed by a wall material which surrounds the frequency doubling medium forming the waveguide core and has a lower refractive index than the waveguide core. In this way, the waveguide structure can be produced in a simple manner with the desired dimensions.

Preferably, the wall material is based on the same material as the frequency doubling medium and has a lower refractive index than this due to a different doping in order to have the radiation guided at the boundary surfaces between the wall material and the frequency doubling medium.

Such a production of a waveguide structure is possible in the most varied of ways. In one advantageous embodiment, the waveguide structure is formed by doping of regions forming the wall material in a material identical to the frequency doubling medium. This embodiment creates the possibility of achieving the waveguide in a simple manner, starting from the material of the frequency doubling medium, by doping the regions which are intended to form the wall material for the waveguide.

A doping of this type is possible, for example, by diffusion of doping elements. Doped regions of this type can be produced particularly advantageously when the waveguide structure is formed by layers which are applied to a preferably single-crystalline substrate and comprise the wall material.

In the same way, the frequency doubling medium can be produced in a simple manner when this is formed by a layer applied to a substrate.

Preferably, the substrate is likewise made from the material of the frequency doubling medium.

The use of a substrate has, in particular, the advantage that a defined alignment of optical axes of the frequency doubling medium can be predetermined by alignment of the substrate insofar as this substrate is based on the material which is also provided for the frequency doubling medium.

In order to achieve the phase matching required for the frequency doubling, it is preferable for the frequency doubling medium to be designed and with respect to its optical axes to be aligned in relation to the waveguide channel such that an uncritical phase matching results between the radiation generated by the radiation source and coupled in and the doubled radiation in longitudinal direction of the waveguide structure.

To carry out this phase matching, it is preferable for the frequency doubling medium to be brought to a defined temperature and kept at this temperature so that the optimum phase matching can be maintained following a one-time setting of the temperature.

Alternatively thereto, it is provided in an advantageous embodiment that the frequency doubling medium is designed and aligned such that a quasi-phase matching results in longitudinal direction of the waveguide.

Further features and advantages of the invention are the subject matter of the following description as well as the drawings of several embodiments.

BRIEF DESCRIPTION OF THE DRAWINGS

FIG. 26 is a schematic side view of a third embodiment of an inventive semiconductor emitter encapsulated in a housing and having corresponding controls and FIG. 27 is an enlarged illustration of a detail of a variation of the optical imaging means according to FIG. 26.

DETAILED DESCRIPTION OF THE INVENTION

Figure 1:
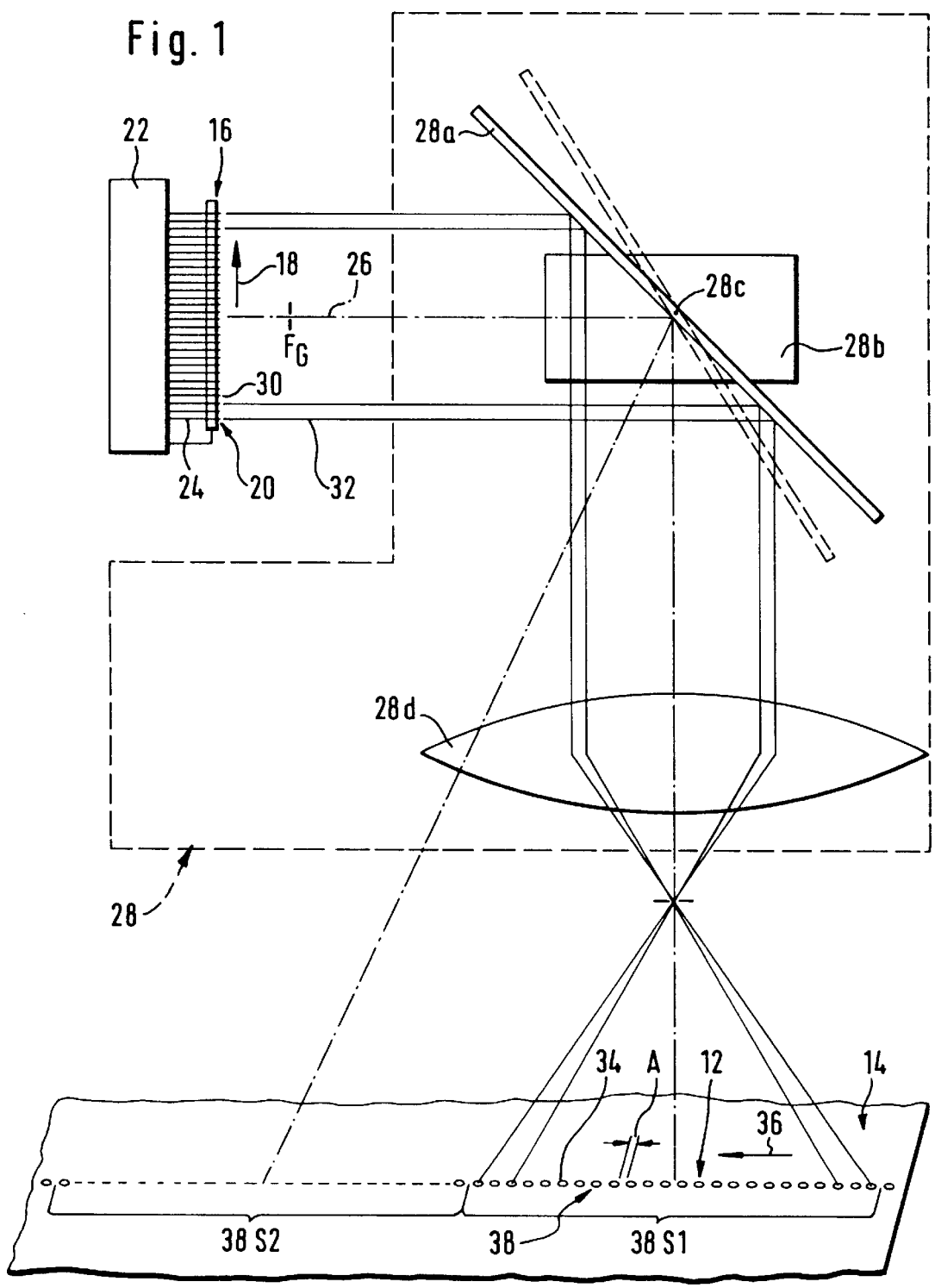
FIG. 1 is a schematic side view of a first embodiment of an inventive apparatus.
Figure 2:
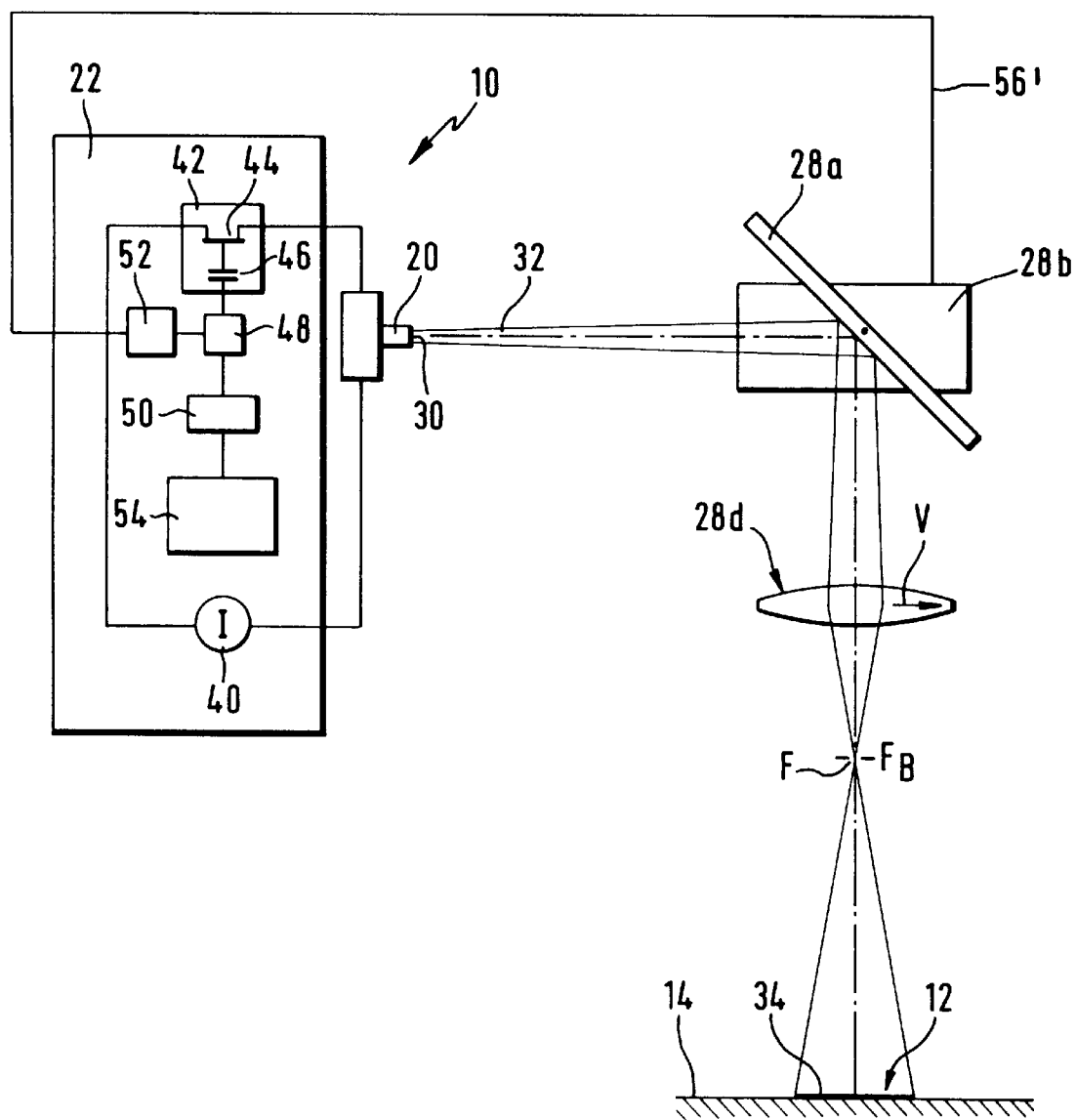
FIG. 2 is a schematic side view of the first embodiment according to FIG. 1 with an over-proportionally enlarged illustration of the optical projection and a schematic illustration of the control.

A first, simplest embodiment of an inventive apparatus for generating an image 12 on an image plane 14—for example, a plane of projection, on which the image is generated so as to be perceptible to a human eye—, which is illustrated in FIGS. 1 and 2 and designated as a whole as 10, comprises a plurality of semiconductor emitters 20 which are arranged in a row of light sources 16 along a longitudinal direction 18 of the row of light sources 16 and each of which can be controlled individually by a common control 22 via individual control lines 24.

The longitudinal direction 18 extends transversely to an optical axis 26 of an optical projection means designated as a whole as 28, which images an exit spot 30 of each semiconductor emitter 20, from which radiation 32 generated by this emitter exits, onto an image spot 34 of the image plane 14 which is then illuminated by the radiation generated by the semiconductor emitter 20. In this respect, the optical projection means 28 is constructed such that the exit spot 30 of each semiconductor emitter 20 is projected only onto a single image spot 34 in the image plane 14 at a specific point of time.

In the simplest case, the optical projection means 28 comprises, as schematically illustrated in FIGS. 1 and 2, a tilting mirror 28a which is pivotable about a tilt axis 28c by means of a pivot drive 28b and a lens 28d which illuminates the image spot 34 with the radiation 32 exiting with a slight divergence from each semiconductor emitter 20 due to geometrical projection, whereby the image spot 34 generally has a surface area which corresponds to a multiple of the exit spot 30.

The image curvature is corrected either via a suitably shaped lens 28d or via a suitably controlled movement of the mirror such that this does not oscillate about the stationary tilt axis 28c but, rather, the tilt axis is likewise moved.

In the simplest case, in which the row of light sources 16 consists of individual semiconductor emitters 30 arranged next to one another in the longitudinal direction 18 and the optical projection means 28 comprises the tilting mirror 28a and the simple lens 28d, individual, adjacently located image spots 34, which together form a row of image spots 38, result on the image plane 14 in a longitudinal direction 36. The optical projection means 28 is preferably designed such that the individual image spots 34 of the row of image spots 38 do not overlap in the direction of the longitudinal direction 36. An embodiment of the plane of projection which is particularly preferred is one, in which the image spots 34 succeed one another with their outer boundaries at a slight distance A or border on one another.

Since the number of semiconductor emitters 20 is less than the total number of the image spots 34 of the row of image spots 38, the row of image spots 38 is composed of several sets 38S of adjacently located image spots 34, whereby in each set 38S the image spots immediately follow on from one another and the sets 38S likewise immediately follow one another in the longitudinal direction 36 so that the adjacently located image spots 34 of consecutive sets 38S likewise have the distance A from one another, like adjacent image spots 34 within one of the sets 38S.

The entirety of the sets 38S of the image spots 34 therefore results in the entirety of the image spots 34 of the row of image spots 38.

For this purpose, the tilting mirror 28a can be tilted into different positions so that, as illustrated, for example, in FIG. 1 with the solid-line position of the tilting mirror 28a, the set 38S1 of image spots 34 can be generated and, subsequently thereto, as illustrated in FIG. 1 by the position of the tilting mirror 28a shown by dash-dot lines, the following set 38S2.

For this purpose, a corresponding tilting of the tilting mirror 28a about the tilt axis 28c by means of the pivot drive 28b is to be carried out, whereby the pivot drive 28b is designed such that, after illumination of the image spots belonging to the set 38S1, it is pivoted quickly into the position shown by dash-dot lines during a time Ta1 in order to illuminate the image spots 34 of the set 38S2 during the time Ta2 which is of equal length to the time Ta1.

The relations illustrated in FIG. 1 are merely schematic. In accordance with the invention, it is provided for a row of image spots 38 to be built up, for example, of ten sets 38S of image spots 34 and, therefore, for the tilting mirror 28a also to be pivotable into ten different positions, whereby each of the sets 38S of image spots 34 is illuminated during the period of time Ta which is of equal length for all the sets 38S.

Thus, a row of image spots 38 consisting of 1250 image spots 34 can, for example, be built up by a row of light sources 16 having 125 semiconductor emitters 20 by the row of light sources 16 illuminating 10 adjacently located sets 38S of image spots 34 one after the other during an image build-up cycle, whereby the image build-up cycle is periodically repeated.

In order to vary the brightness of the image spots 34 for the human eye observing the image 12, the control 22, as illustrated in FIG. 2, comprises a common current source 40 for all the semiconductor emitters 20 which supplies a current control block 42 provided for each semiconductor emitter 20. This current control block comprises, for example, an FET transistor 44 as current controlling element, a capacitor 46 being connected to its gate as storage element. This capacitor 46 of each current control block 42 can be charged with a predetermined charge via a control switch 48, whereby the charge in the capacitor 46 determines the current through the FET transistor 44. The charge to be stored in the capacitor 46 is thereby read out from an intermediate store 50 for each capacitor 46 of each current control block 42 by triggering the control switch 48 from the intermediate store 50, whereby the intermediate store 50 preferably stores all the control parameters and by triggering the control switch 48 all the control parameters are read simultaneously into the capacitors 46 of all the current control blocks 42.

A trigger block 52 is provided for triggering the control switch 48.

Between the points of time t, at which the trigger block 52 triggers the control switch 48, it is possible to read the individual control parameters serially into the intermediate store 50 via an image generator 54 so that at every triggering point of time t the intermediate store 50 has stored the actual control parameters for all the semiconductor emitters 20 of the row of light sources 16.

Figure 3:
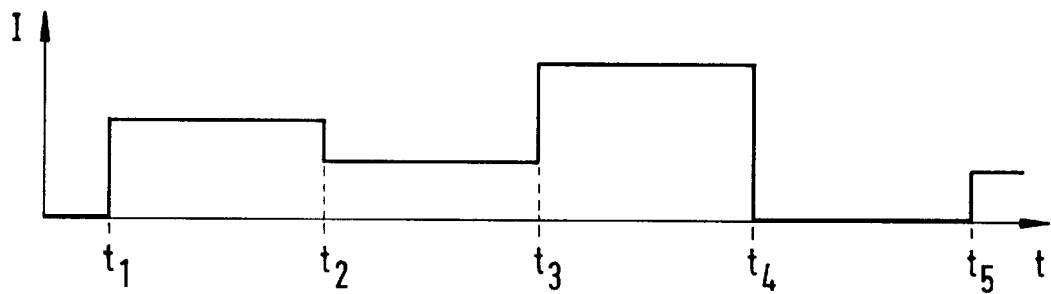
FIG. 3 is a schematic illustration of the course of the intensity of the radiation from a semiconductor emitter after different control points of time.

When a semiconductor emitter 20 is now considered, the intensity of the radiation 32 emitted thereby can, as illustrated in FIG. 3, be determined at the control point of time $t_1$ by correspondingly charging the capacitor 46 of the corresponding control block 42. The charge then remains in the capacitor 46 so that the intensity of the radiation from the semiconductor emitter remains constant up to the next control point of time $t_2$. If, at this point of time, the charge in the capacitor 46 is reduced, this intensity is also maintained up to the next control point of time $t_3$. At the control point of time $t_3$, the maximum intensity and, with it, the maximum charge in the capacitor 46 is, for example, stored in the capacitor 46 whereas at the control point of time $t_4$ the minimum charge is stored so that the semiconductor emitter 20 emits no radiation or radiation with the intensity 0 between the control points of time $t_4$ and $t_5$.

Due to the fact that each semiconductor emitter 10 is provided with its own control block 42, each individual semiconductor emitter 20 of the row of light sources 16 can be controlled individually so that the row of image spots 38 has image spots 34 of the most varying intensities.

The trigger block 52 is, on the one hand, connected via a line 56 with the pivot drive 28 and synchronized with the pivot drive such that all the capacitors 46 for all the control blocks 42 are, for example, charged at the control point of time $t_1$ with the values necessary for illuminating all the image spots 34 of the set 38S1 and the capacitors 46 are charged at the point of time $t_2$ such that they store the values for the image spots 34 of the set 38S2. At the same time, at the control point of time $t_2$ the pivot drive 28b carries out the pivot movement from the position shown by solid lines in FIG. 1 into the position shown by dash-dot lines with as high a speed as possible.

The period of time Ta, during which all the image spots 34 of the set 38S1 are illuminated according to the brightness values stored in the image generator 54, therefore corresponds to the period of time between $t_1$ and $t_2$.

This procedure is repeated during an image build-up cycle for such a time until all the sets 38S of image spots 34 of the row of image spots 38 have been illuminated one after the other during the period of time Ta.

Figure 4:
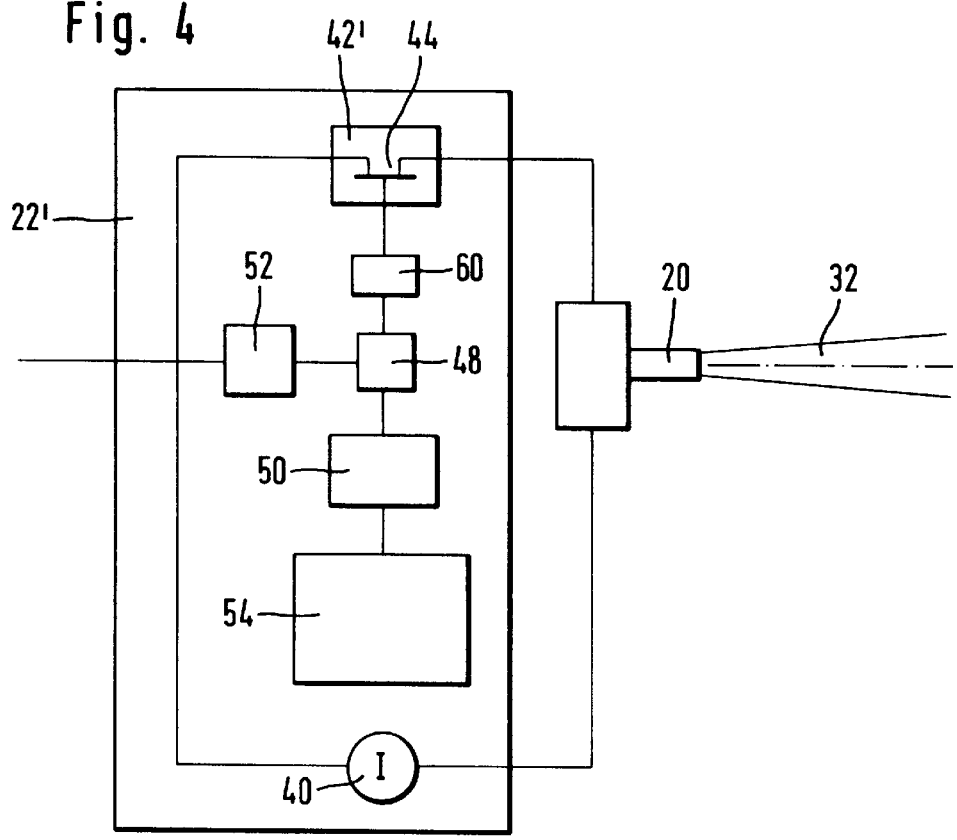
FIG. 4 is a schematic illustration of a second embodiment of the inventive control from the first embodiment of the inventive apparatus.

In an alternative embodiment of the inventive control 22', illustrated in FIG. 4, those components which are identical to the control 22 have been given the same reference numerals and so with respect to their description reference is made in full to the comments concerning the control 22.

Figure 5:
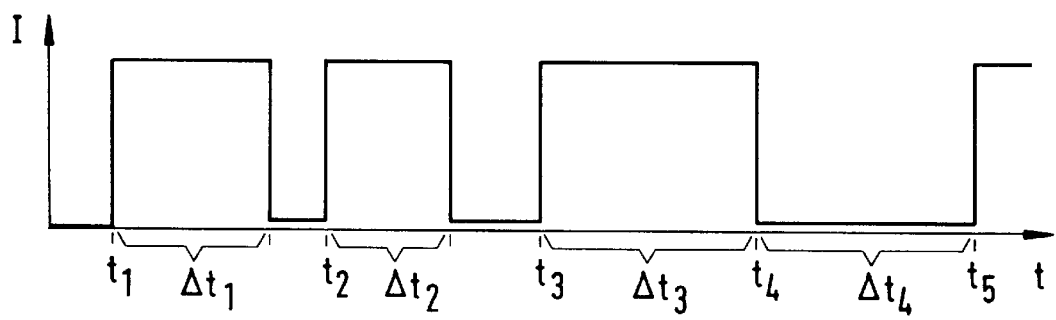
FIG. 5 is a schematic illustration of the course of the intensity of the radiation from the semiconductor emitter in the second embodiment of the control.

In contrast to the control 22, each control block 42' comprises only the control transistor 44, the gate of which is controlled by a pulse shaping stage 60 and is merely switched between the on and off states. The pulse shaping stage, for its part, stores the control parameters transmitted at the respective control point of time t and, in accordance with the control parameters, shapes a control pulse of varying length for the control transistor 44 according to the principle of pulse width modulation so that the semiconductor emitter 20 is also switched either on or off but for a varying length of time between the respective control points of time t, as illustrated in FIG. 5.

The constant power values between the control points t1, t2, t3 and t4 are realized by means of pulse durations $\Delta t_1$, $\Delta t_2$, $\Delta t_3$ of different lengths, whereby the semiconductor emitter emits radiation 32 of the maximum power during the respective pulse durations $\Delta t_1$, $\Delta t_2$, $\Delta t_3$. In this respect, use is made of the effect that the human eye carries out a time averaging when observing the image spot 34 and therefore the different pulse widths $\Delta t_1$, $\Delta t_2$ and $\Delta t_3$ convey the impression to the human eye as if the power values illustrated in FIG. 3 were present during the entire period of time between the control times $t_1$, $t_2$, $t_3$ and $t_4$.

As for the rest, the control 22' is of an identical construction to the control 22.

Figure 6:
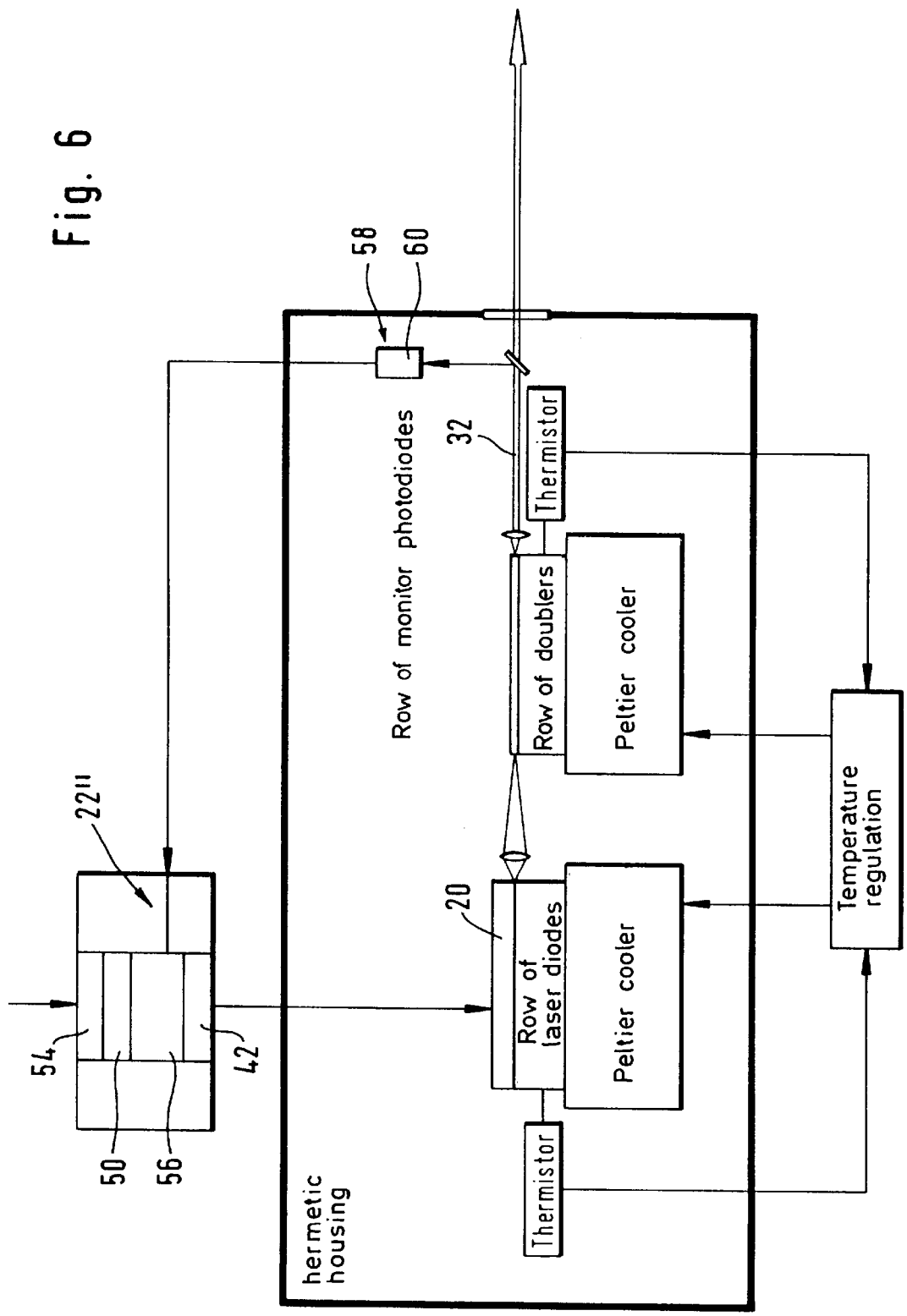
FIG. 6 is a schematic illustration of a third embodiment of the control in a special form of a semiconductor emitter.

A third embodiment of an inventive control 22", illustrated in FIG. 6, is constructed in contrast to the embodiment described in the above such that during the prescribed illumination time Ta each current control block adjusts the current of the respective semiconductor emitter 20 to the nominal value stored in the intermediate store 50 for each set 38S by means of a regulation circuit 56, whereby the regulation circuit 56 measures the quantity of light of the radiation 32 emitted from each semiconductor emitter 20 via monitor photodiodes 60 which are combined to form a row of monitor photodiodes 58 and controls the respective semiconductor emitter 30 in accordance with the measured value.

The semiconductor emitter 20 can hereby be controlled with a variable current, as illustrated in FIG. 3, so that the regulation circuit 56 regulates the amount of current for each semiconductor emitter 20, or it is provided for the regulation circuit 56 to regulate the period of time $\Delta t$, during which each semiconductor emitter 20 is supplied with maximum current, whereby the regulation circuit 56 switches off the current to the respective semiconductor emitter 20 once the quantity of light predetermined as nominal value in the intermediate store 50 has been reached.

Figure 7:
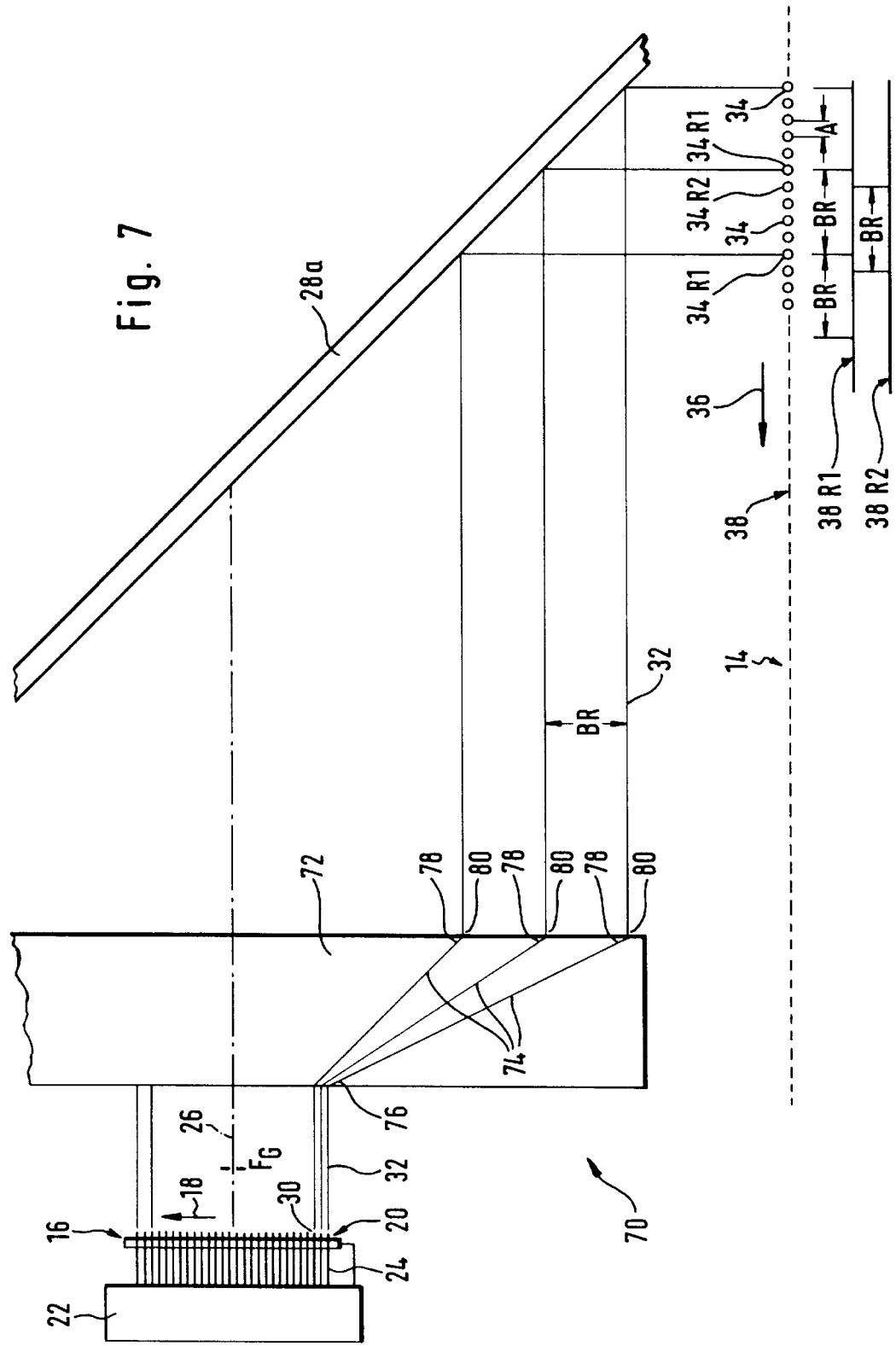
FIG. 7 is a view similar to FIG. 1 of a second embodiment of an inventive solution with a first embodiment of an optical spreading means.

In a second embodiment of an inventive apparatus, illustrated in FIG. 7, the optical projection means 28 comprises an optical spreading means 70 which spaces the radiation 32 from the semiconductor emitters apart to a greater extent and which, in the simplest case, as illustrated in FIG. 7, has a substrate material 72 with a refractive index $n_1$, into which waveguide paths 74 with a refractive index $n_2$ which is greater than $n_1$ are introduced.

The radiation 32 of the individual semiconductor emitters 20 coming from the respective exit spots 30 is coupled into each of these waveguide paths 74 in the region of one end 76 and guided to a second end 78, from which the radiation 32 then exits again.

The first ends 76 of the waveguide paths 74 are spaced at distances which correspond to the distance between the exit spots 30 of the individual semiconductor emitters 20 so that the radiation 32 exiting from the exit spots 30 enters the waveguide paths 74 in the region of the first ends 76 and is guided from there to the second ends 78 which have exit spots 80 for the radiation 32 which are located in an image spot pattern spacing BR from one another. The radiation exiting from the optical spreading means 70 is, again, imaged onto the row of image spots 38 in the image plane 14 by the tilting mirror 28a, whereby in one position of the tilting mirror 28a consecutive semiconductor emitters 20 are associated with individual image spots 34, the distance between which is a multiple of the distance A between the image spots 34 of the row of image spots 38. The image spots 34 illuminated by the row of light sources 16 in one position of the tilting mirror 28a thereby form an image spot pattern 38R, whereby the same number of image spots 34 is located each time between individual image spots 34R1 of the image spot pattern 38R1.

The image spot pattern 38R1 extends over the entire extension of the row of image spots 38 in the longitudinal direction 36.

If the tilting mirror 28a is tilted slightly, the semiconductor emitter 20 which was previously associated with one of the image spots 34R1 will then be associated with the adjacently located image spot 34R2, whereby a new image spot pattern 38R2 results due to the association of all the semiconductor emitters 20 with the image spot 34R2 respectively adjacent to the image spots 34R1 of the image spot pattern 38R1 and the image spots 34R2 of this new pattern 38R2 are the image spots following the image spots 34R1 of the image spot pattern 38R1 in the row of image spots 38.

When the tilting mirror 28a is tilted further, the semiconductor emitters 20 of the row of light sources 16 are then associated with the image spots 34 again adjacently located in order to form an image spot pattern 38R3 etc., for such a time until all the image spots 34 of the row of image spots 38 were once part of an image spot pattern 38R. The image build-up cycle also lasts for the same length of time; according to this cycle all the image spots 34 of the row of image spots 38 can be illuminated due to the comb-like association of individual image spots with a respective image spot pattern and due to the fact that the image spot pattern is moved on further to respectively adjacent image spots.

The image build-up cycles are repeated periodically in the same manner as that described in conjunction with the first embodiment of the inventive apparatus, whereby in this embodiment the angle of tilt, through which the tilting mirror 28a is to be pivoted, is considerably smaller than in the first embodiment.

Figure 8:
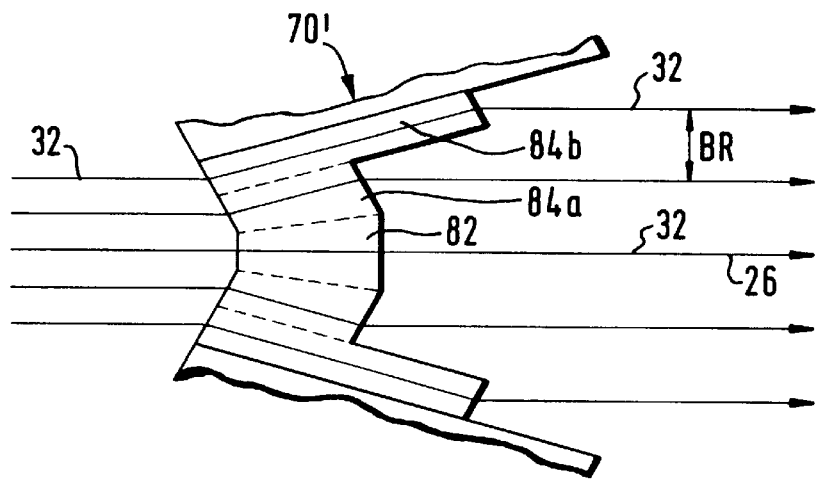
FIG. 8 is an enlarged illustration of a detail of a second embodiment of an optical spreading means for the second embodiment of the inventive apparatus according to FIG. 7.

A further embodiment of an inventive optical spreading means 70', a detail of which is illustrated in FIG. 8, comprises a plurality of prism elements 82, 84, whereby the prism element 82 is, for example, a prism element, through which the radiation 32 passes unaltered and which is arranged coaxially to the optical axis 26, whereas the prism elements 84a, b etc. each bring the radiation 32 from the individual semiconductor emitters 20 into the image spot pattern spacing BR symmetrical to the optical axis 26. For this purpose, they are designed such that they guide the radiation 32 away from the optical axis 26 in a defined angle thereto and due to a varying length in the direction of radiation bring the radiation 32 into the image spot pattern spacing BR which is the same as the image spot pattern spacing BR described in conjunction with the second embodiment of the inventive apparatus in FIG. 7.

Figure 9:
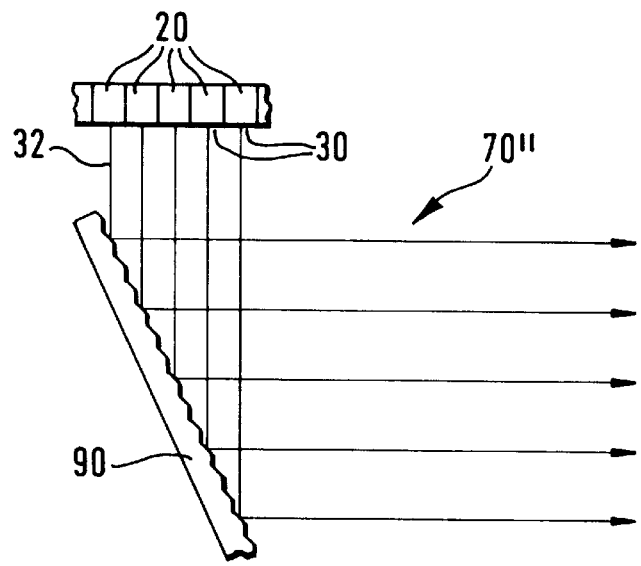
FIG. 9 and FIG. 9a show a schematic illustration of a detail of a third embodiment of an optical spreading means for the second embodiment according to FIG. 7.
Figure 9A:
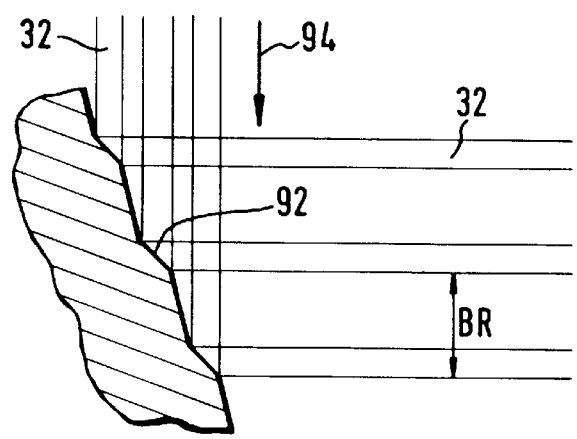

In a second variation 70" of an inventive optical spreading means, illustrated in FIG. 9, the radiation 32 coming from the semiconductor emitters 20 is reflected by a reflection grating 90 which has reflection surfaces 92 spaced from one another in the direction of incidence 94 of the radiation 32 coming from the semiconductor emitters by a distance which corresponds to the image spot pattern spacing BR. These surfaces are also spaced at right angles to the direction of incidence 94 by a distance which corresponds to the distance between the exit spots 30 of the semiconductor emitters so that the radiation 32 coming from the exit spots 30 impinges directly onto the reflection surfaces 92 and is reflected by them as radiation 32 with the desired image spot pattern spacing BR.

Figure 10:
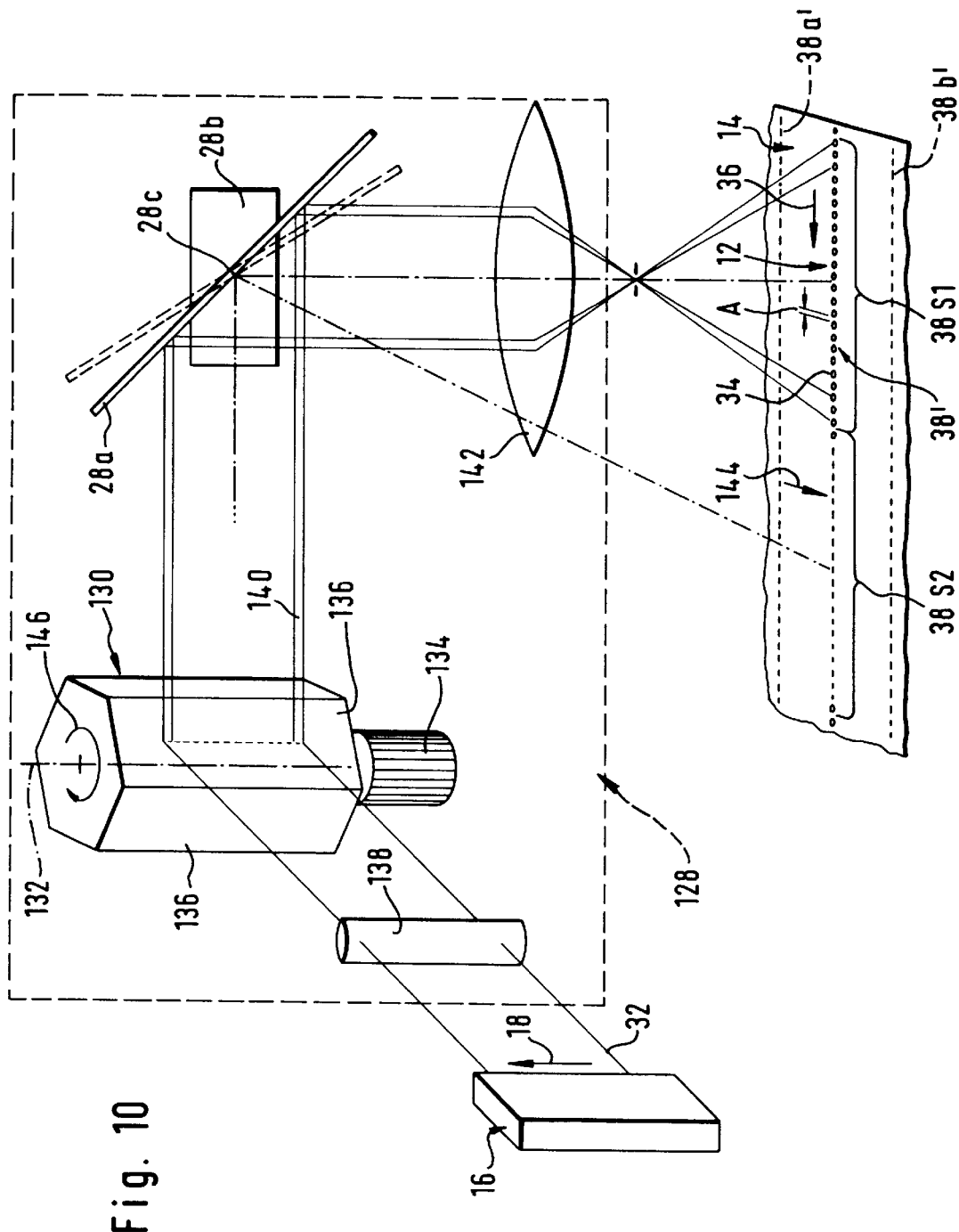
FIG. 10 is a partially perspective, schematic illustration of a third embodiment.

In a third embodiment of the inventive apparatus, illustrated in FIG. 10, the optical projection means designated as a whole as 128 comprises in addition to the elements described in conjunction with the first embodiment, such as tilting mirror 28a and pivot drive 28b, a polygonal mirror 130 which is driven by a drive 134 for rotation about an axis 132 parallel to the longitudinal direction 18. The polygonal mirror 130 has, for its part, a plurality of polygonal surfaces 136 which are arranged at equal angular distances one of the axis 132, whereby one of the polygonal surfaces 136 serves each time as reflection surface.

The row of light sources 16 comprises, in exactly the same way as in the first embodiment, a plurality of semiconductor emitters 20 which are arranged consecutively in the longitudinal direction 18 and likewise controlled by a control 22, 22' or 22".

The radiation 32 exiting from the exit spots 30 is first of all focused by a first optical focusing means 138 onto the polygonal surface 136 located in the reflection position, and the radiation 140 reflected by the polygonal surface 136 located in the reflection position is reflected by the tilting mirror 28a, intermediately focused by a second optical focusing means 142 and imaged on the image plane 14.

Due to the fact that the polygonal surface 136 located in the reflection position rotates about the axis 132 for as long as it is irradiated by the radiation 32, not just one row of image spots 38 results on the image plane 14 but rather a plurality of rows of image spots 38' which are arranged next to one another in a transverse direction 144 extending at right angles to the longitudinal direction 36. In this respect, a first row of image spots 38a' is generated on the image plane 14 when the polygonal surface 136 located in the reflection position is acted upon by the radiation 32 in its foremost region 136a in the direction of rotation 146 and the last row of image spots 38b' is generated when the polygonal surface 136 located in the reflection position is acted upon by the radiation 32 in its rearmost region 136b in the direction of rotation 146 of the polygonal mirror.

Due to the rotating polygonal mirror 130, each set of image spots 38S is first of all imaged onto all the rows 38', i.e. from row 38a' to row 38b', by one of the polygonal surfaces 136 when the position of the tilting mirror 28a remains unchanged. As soon as the polygonal surface 136 located in the reflection position changes to the next surface when the polygonal mirror 130 rotates, the tilting mirror 28a has moved on to such an extent that it illuminates the next following set of image spots 38S in all the rows of image spots 38', i.e. the set of image spots 38S2, for example, and continues this illumination until the polygonal surface 136 now located in the reflection position has projected this set of image spots onto all the rows of image spots 38'. With the changeover to the next polygonal mirror 136 the tilting mirror 28a has likewise moved on again so that the next following set of image spots 38S3 is now projected onto the rows of image spots 38'.

The rotating polygonal mirror 130 is likewise synchronized by the respective control 22, 22' or 22" via the connection with the trigger block 52, whereby the tilting movement of the tilting mirror 28a is synchronized with the rotary movement of the polygonal mirror 130 such that the tilting mirror 28a images the row of light sources 16 onto the respectively following set of image spots when the next following polygonal surface 136 is located in the reflection position. For this purpose, the drive 134 of the polygonal mirror is preferably provided with an angle-position decoder and, at the same time, the pivot drive 28b of the tilting mirror 28a, as well, so that a simple synchronization is possible via the respective control 22, 22', 22" (FIG. 11).

The tilting mirror 28a is driven by the pivot drive 28b such that it changes quickly from one position into the other and this changeover takes approximately the same amount of time as the changeover from one polygonal surface to the next and so the dead time is thereby as small as possible.

The time intervals, in which the tilting mirror 28a is moved and changes from one set to the other, amount, for example, with 125 semiconductor emitters and 100 image build-up cycles per second as well as 1250 image spots per row of image spots to a maximum of 1 $\mu$s; during this maximum 1 $\mu$s, the polygonal mirror 130 then images a respective set of image spots onto all the rows of image spots 38' with one polygonal surface 136.

Figure 11:
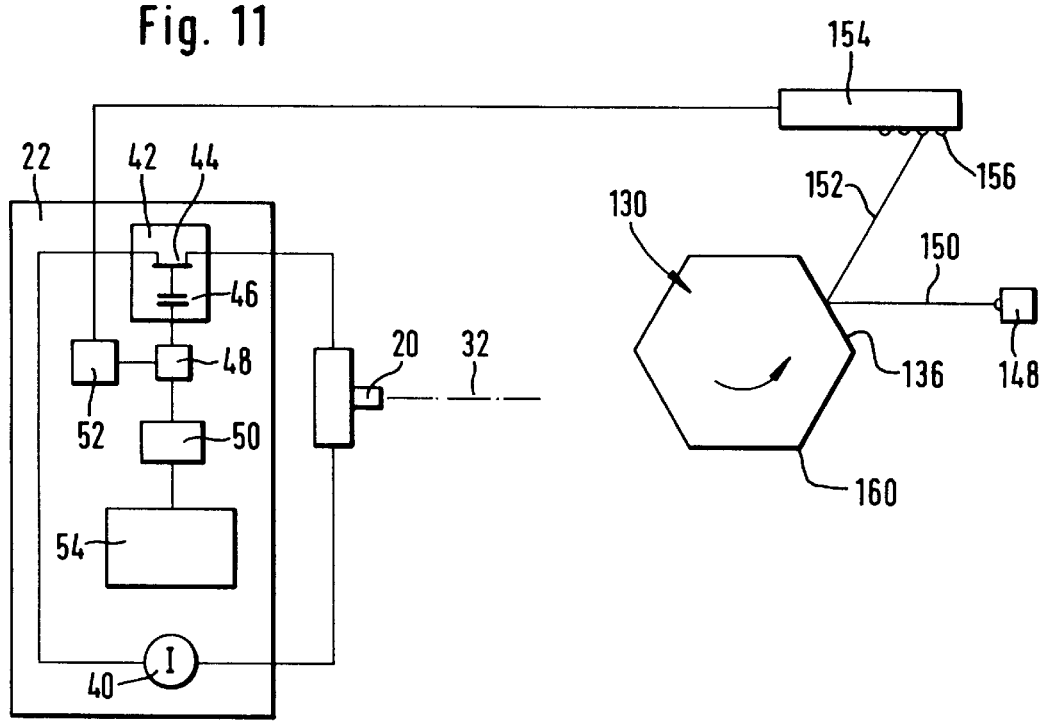
FIG. 11 is a schematic illustration of the first embodiment of the inventive control in conjunction with the third embodiment.

In order to synchronize the rotating polygonal mirror 130 with the control 22, a further semiconductor emitter 148 is provided, as illustrated in FIG. 11. This semiconductor emitter illuminates, for example, the polygonal surface 136 opposite to the polygonal surface 136 located in the reflection position with a beam of light 150, whereby the reflected radiation 152 impinges on a detector designated as a whole as 154. This detector has a detector region 156 or several detector regions 156, whereby the detector regions 156 have an extension which corresponds approximately to the cross section of the reflected radiation 152 so that when the reflected radiation 152 impinges on the respective detector region 156 an exact angular position of the polygonal mirror 130 is determined.

The first detector region 156 is, for example, positioned such that when the reflected radiation 152 impinges thereon the polygonal surface 136 located in the reflection position images the exit spots 30 of the semiconductor emitters 20 of the row of light sources 16 onto the first row of image spots 38a' in the respective set of image spots 38S. In addition, the second detector surface 156 is preferably arranged such that when the reflected radiation 152 impinges thereon the polygonal surface 136 located in the reflection position images the exit spots 30 of the semiconductor emitters 20 of the row of light sources 16 onto the second row of image spots 38' and so on.

The impingement of the reflected radiation 152 on one of the detector regions 156 generates in the detector 154 a signal which is conveyed, for example, to the trigger block 52 and causes this to trigger the control switch 48, possibly with a corresponding time delay, so that the control parameter for each current control block 42 can be altered at these control points of time t. It is therefore possible to project image spots 34 onto each row of image spots 38' with a different distribution of intensity and thus build up a two-dimensional image on the image plane 14, this image extending in longitudinal direction 36 and transverse direction 144 and consisting of the individual image spots 34 of the row of image spots 38'. The control points of time t are thereby synchronized with the rotation of the polygonal mirror 130 such that they preferably coincide with the points of time, at which the radiation 32 would impinge on an edge 160 located between two polygonal surfaces 136.

Figure 12:
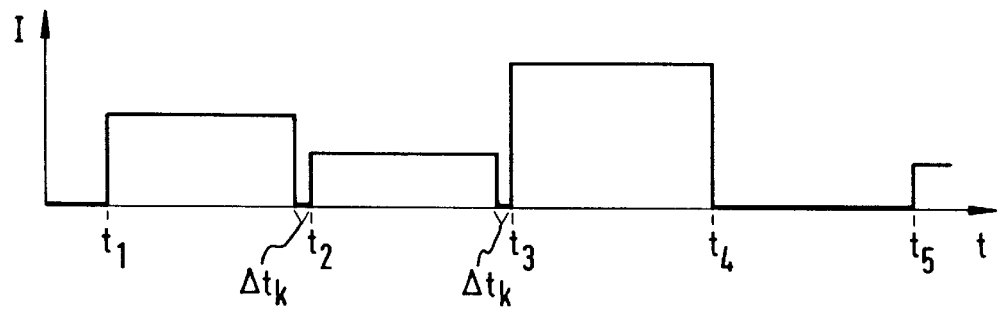
FIG. 12 is a schematic illustration of the intensity course similar to FIG. 3.

It is particularly advantageous thereby when all the semiconductor emitters are temporarily switched off at the point of time, at which the radiation 32 would impinge directly on the edge 160, for the period of time $\Delta t_k$ and, therefore, do not emit any radiation 32 for such a time until the polygonal surface 136 following the edge 160 is again located in a reflection position and reflects the radiation 32 again such that the exit spots 30 of the semiconductor emitters 20 are located in the first row of image spots 38a'. Such a control is illustrated in FIG. 12 for the case of the control 22. In this case, the control switch 48 is designed such that it first of all discharges the capacitor 46 at the respective control point of time t and then recharges it with the correct control parameter stored in the intermediate store 50.

Figure 13:
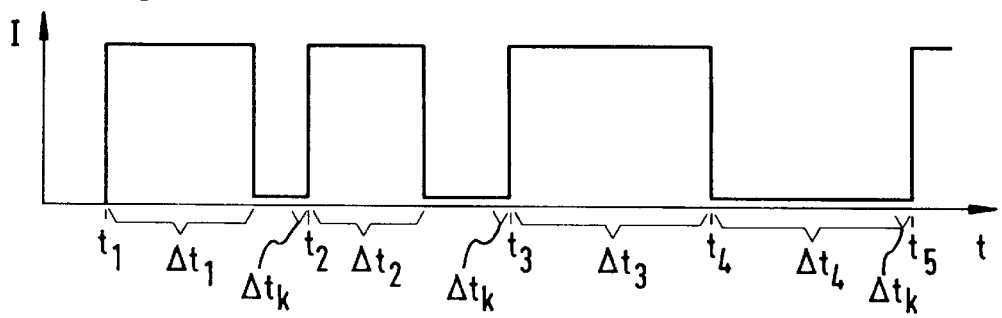
FIG. 13 is a schematic illustration of the intensity course similar to FIG. 5 when using the second embodiment of the inventive control in conjunction with the third embodiment of the inventive apparatus.

In the case of the control 22', as illustrated in FIG. 13, the semiconductor emitters 20 can be switched off shortly before the respective control point of time t simply by making the maximum pulse width $\Delta t$ shorter in time by the amount $\Delta t_k$ than the period of time between consecutive control points of time t which preferably succeed one another at constant time intervals.

In the embodiment illustrated in FIG. 10, the drive 134 continuously rotates the polygonal mirror 130 at an essentially stabilized rotational speed.

Alternatively thereto, it is conceivable to provide as drive 134 a stepping motor which can be brought in a controlled manner into individual rotational positions and, therefore, does not continuously rotate the polygonal mirror 130 but rather rotates it into such respective rotational positions that the polygonal surface 136 located in the reflection position successively takes up different angular positions in relation to the radiation 32, whereby each individual angular position corresponds to the reflection of the exit spots 30 of the row of light sources 16 onto one of the rows of image spots 38'. Thus, the rows of image spots 38' are illuminated during a defined time and, subsequently, the polygonal surface 136 located in the reflection position "jumps" into the next rotational position. In this case, it is also possible to jump over the edge 160 due to a rapid rotation of the polygonal mirror 130.

The trigger block 52 can also then be controlled in accordance with the control of the stepping motor so that the detection of the rotational position of the polygonal mirror 130 by means of the detector 154 can be omitted.

Figure 14:
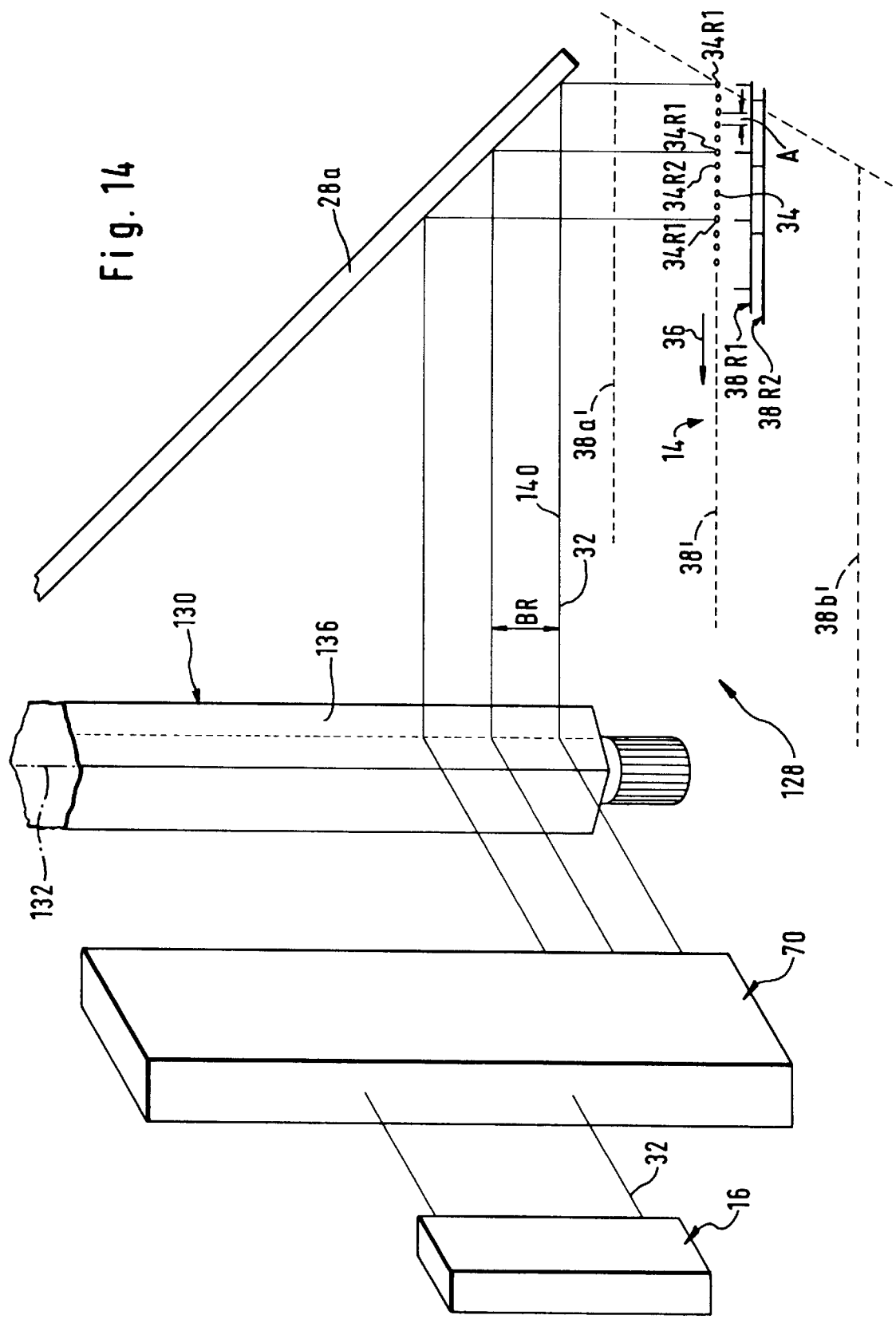
FIG. 14 is a schematic illustration similar to FIG. 10 of a fourth embodiment of the inventive apparatus.

A fourth embodiment of the inventive apparatus, illustrated in FIG. 14, is based on the second embodiment and provides for an optical projection means 128 which is designed in the same manner as in the third embodiment so that the radiation 32 spread out to the image spot pattern spacing BR by the optical spreading means 70 now impinges on the tilting mirror 28a in the same manner as in the second embodiment and illuminates in each of the rows of image spots 38' the image spots 34 which are comprised by the respective image spot pattern 38R.

In this embodiment, one and the same image spot pattern 38R is generated, analogously to the third embodiment, by the rotating polygonal mirror 130 in all the rows of image spots 38' and then this proceed s to the next image spot pattern 38R and this, again, is generated in all the rows of image spots 38a', i.e. from the row of image spots 38a' to the row of image spots 38b'.

In this embodiment, the tilting mirror 28a may remain stationary and after generation of the same image spot pattern 38R in each of the rows of image spots 38' jump to the next tilt position in order to generate the next following image spot pattern 38R in all the rows of image spots 38'; it is, however, also possible to pivot the tilting mirror 28a continuously and slowly such that once one and the same image spot pattern 38R has been generated in all the rows of image spots 38', the tilting is so great that the next image spot pattern is already being generated in the first row of image spots 38a'. In this case, however, corresponding image spots 34 in the consecutive rows of image spots 38' are not located on a straight line which extends at right angles to the longitudinal direction 36 but on a straight line which extends at an angle <90° in relation to the longitudinal direction 36. The slanted position of the corresponding image spots 34 in the individual rows of image spots 38' can, however, be tolerated in view of the slight deviation in the angle between the straight lines representing corresponding rows of image spots and the longitudinal direction 36.

The period of time required for projecting each image spot pattern 38R onto all the rows of image spots 38' is a maximum of 1 µs and this is followed by the changeover to the next image spot pattern 38R.

Figure 15:
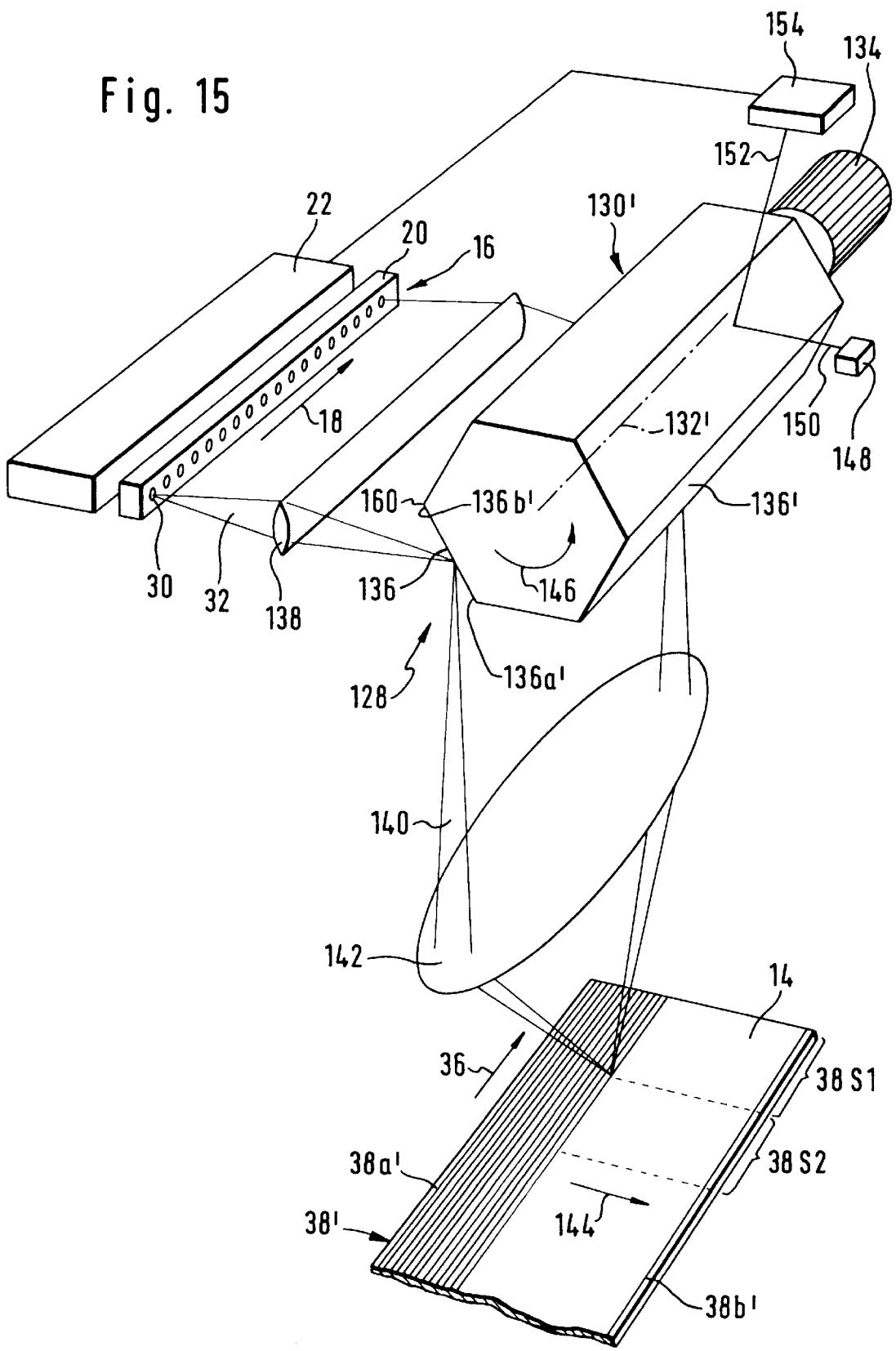
FIG. 15 is a schematic illustration of a fifth embodiment of the inventive apparatus.
Figure 16:
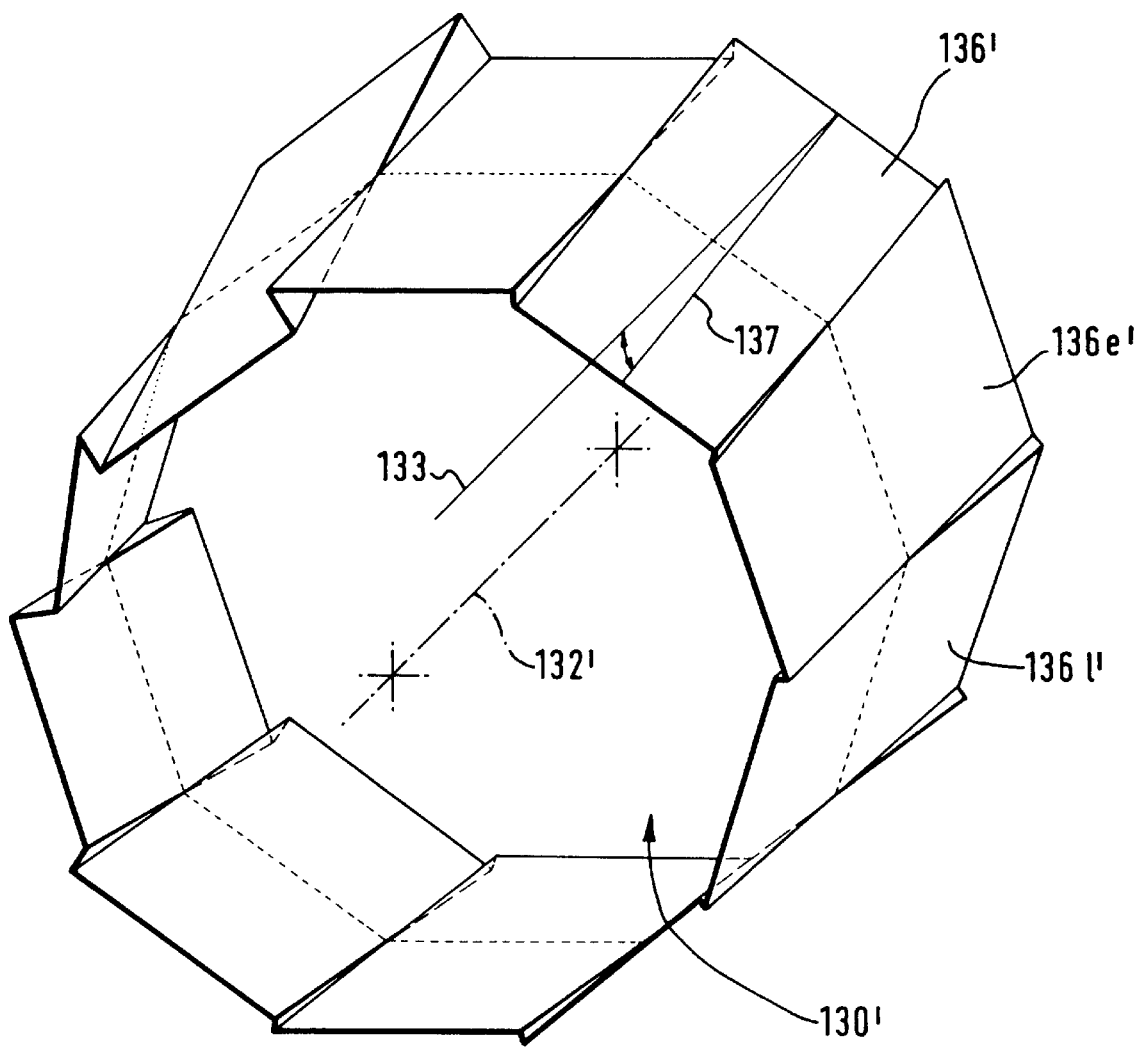
FIG. 16 is an enlarged illustration of the polygonal mirror of the fifth embodiment of the inventive apparatus.

In a fifth embodiment representing a further development of the third embodiment according to FIG. 10 and illustrated in FIG. 15, the tilting mirror 28a can be omitted when the polygonal mirror 130' does not have polygonal surfaces 136' extending parallel to the axis 132' but, as illustrated in FIG. 16, all the polygonal surfaces 136' succeeding a first polygonal surface 136e' as far as the last polygonal surface 136l', which adjoins the first polygonal surface 136e' again, successively have an inclination of their center line 137 in relation to a parallel line 133 to the axis 132 which alters by a constant angular value from polygonal surface 136' to polygon al surface 136l so that these polygonal surfaces 136' which have a respectively different inclination in relation to the axis 132 also take over the function of the tilting mirror 28a.

The first polygonal surface 136e' is, therefore, in the reflection position when the row of light sources 16 is intended to illuminate the set of image spots 38S of the first row of image spots 38a'. As long as the first reflection surface 136e' is located in the reflection position, the image spots 34 of the first set of image spots 38S are generated in all the rows of image spots 38'.

Subsequently, a changeover is made to the next polygonal surface 136' which is now inclined in relation to the axis 132 such that it illuminates the second set of image spots 38S2 directly following the first set of image spots 38S1 and in its reflection position sees to it that the second set of image spots 38S2 is generated in all the rows of image spots 38'.

In the same way, a changeover is then made to the, again, next polygonal surface 136' which is inclined such that this illuminates the third set of image spots 38S3 directly following the second set of image spots 38S2.

Figure 17:
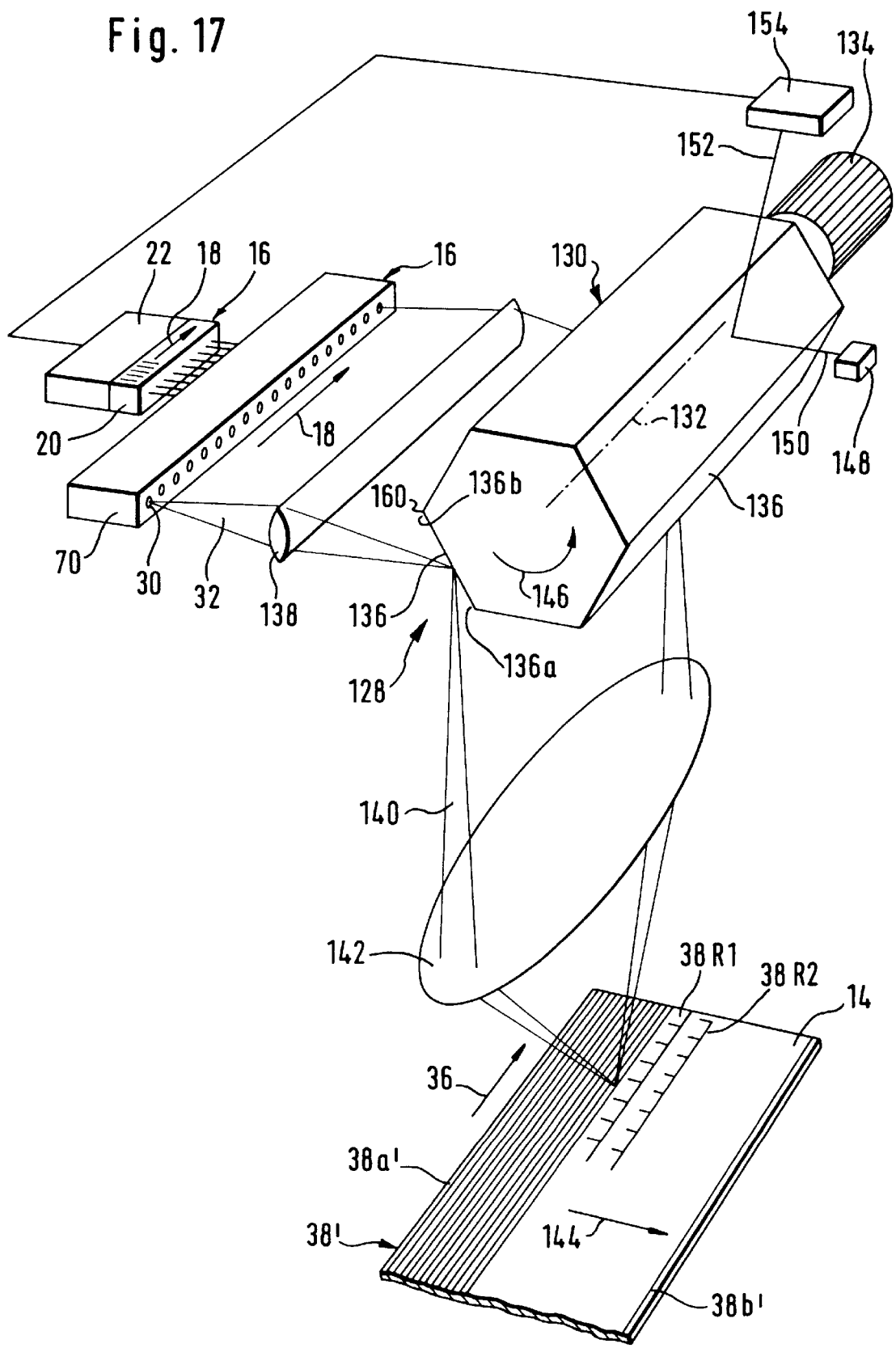
FIG. 17 is a schematic illustration of a sixth embodiment of the inventive apparatus.

A sixth embodiment represents a further development of the fourth embodiment but likewise with an optical projection means 128" having a polygonal mirror according to FIG. 17.

In contrast to the fifth embodiment, however, the angles of the polygonal surfaces 136' in relation to the axis 132 which alter from polygonal surface 136' to polygonal surface 136' are smaller since, when changing from the first image spot pattern 38R1 to the second image spot pattern 38R2, a deviation must take place only in such a manner that it is necessary to jump from the image spots 34 already generated to the next adjacent image spots 34 in each row of image spots 38' whereas, in the fifth embodiment, the second set of image spots 38S2 must be displaced relative to the first set of image spots 38S1 by a distance which corresponds to the number of image spots in one set of image spots 38S multiplied by the distance between the image spots A whereas the displacement in the sixth embodiment need merely take place over the distance between the image spots A.

In the two embodiments described in the above, it is provided per row of light sources 16 that individual semiconductor emitters 20 are seated next to one another in the longitudinal direction 18 and, therefore, the row of light sources 16 is formed by a single row of semiconductor emitters 20.

Figure 18:
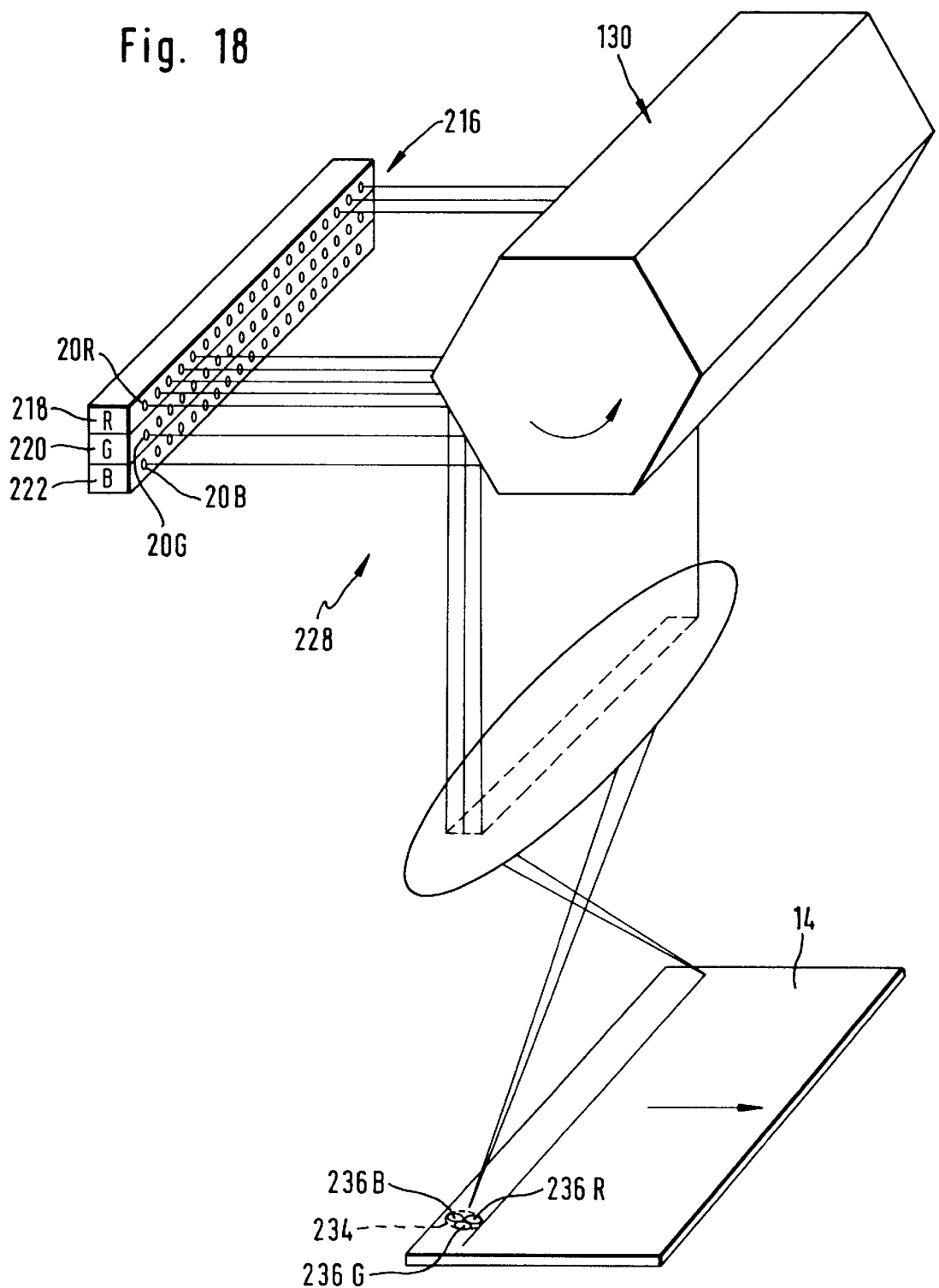
FIG. 18 is a schematic illustration of a seventh embodiment of the inventive apparatus.

In order to generate a multicolored image, it is provided in a seventh embodiment, schematically illustrated in FIG. 18, that each row of light sources 216 has three rows 218, 220 and 222 of semiconductor emitters 20 extending parallel to one another, whereby the row 218 is built up of semiconductor emitters 20R which emit red light, the row 220 is built up of semiconductor emitters 20G which emit green light and the row 222 is built up of semiconductor emitters 20B which emit blue light.

The optical projection means 228 is constructed such that, in each case, one semiconductor emitter 20R, one semiconductor emitter 20G and one semiconductor emitter 20B illuminate one image spot 234, whereby, in the simplest case, the partial image spots 236B, 236G and 236R generated by each of the semiconductor emitters 20R, 20G and 20B are not congruently superimposed but, for example, do not overlap at all or only partially. In the simplest case, an intermediate focusing of the radiation 32 onto the polygonal mirror 130 by means of the first optical focusing means 138 can be dispensed with in such an optical projection means 228.

As for the rest, the optical projection means 228 is of an identical design to the optical projection means 128 of the fifth or sixth embodiment and so reference can be made hereto with respect to details.

Furthermore, the rows 218, 220 and 222 of the semiconductor emitters 20R, 20G and 20B are also controlled in a manner analogous to the possibilities described in conjunction with the first embodiment, whereby an intermediate store 50 is, however, necessary for each of the rows 218, 220 and 222 and a current control block 42 for each semiconductor emitter 20 but the control is effected in such a manner that the control parameters for the semiconductor emitters 20R, 20G and 20B of all three rows 218, 220 and 222 are read out simultaneously from the intermediate store at a control point of time t.

In order to generate a colored image, the wavelengths of the semiconductor emitters 20R, 20G and 20B as well as the possible maximum intensities are selected such that all colors, in particular white, too, can be generated for the human eye in the image spots 234 by color mixing. For this purpose, three control parameters are to be generated by the image generator 54 for each image spot 234 for each of the semiconductor emitters 20R, 20G and 20B illuminating these image spots 234.

Figure 19:
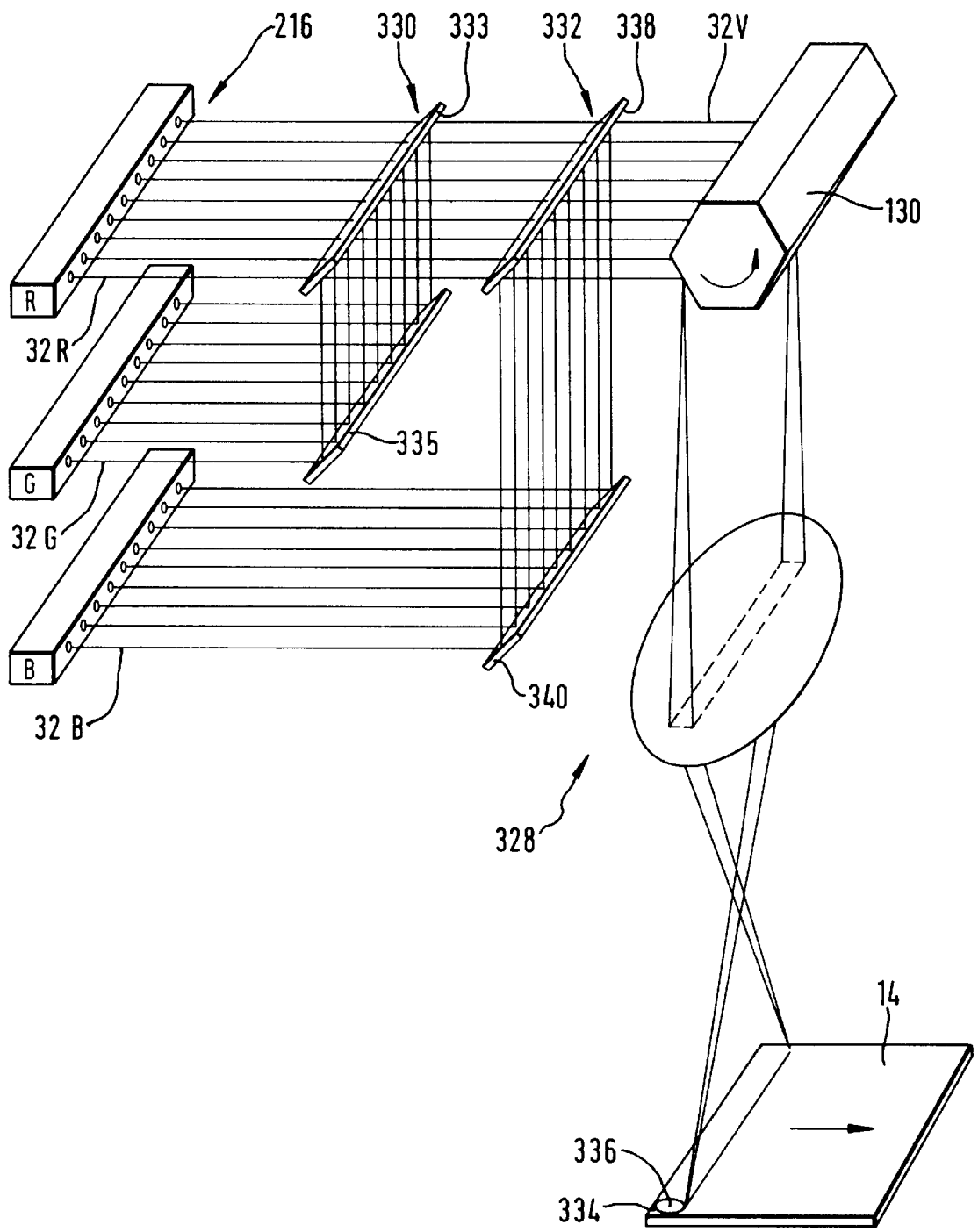
FIG. 19 is a schematic illustration of an eighth embodiment of the inventive apparatus.

In an eighth embodiment, illustrated in FIG. 19, the three rows 218, 220 and 222, respectively comprising the semiconductor emitters 20R, 20G and 20B, are likewise provided. They are again controlled as described in conjunction with the third embodiment.

In contrast to the third embodiment, the optical projection means 328 comprises two respective sets of mirrors 330 and 332 between the row of light sources 216 and the polygonal mirror 130 in order to combine with one another the radiation 32R from the semiconductor emitter 20R, the radiation 32G from the semiconductor emitter 20G and the radiation 32B from the semiconductor emitter 20B.

The first set of mirrors 330 comprises a dichroic mirror 333 arranged in the beam path of the radiation 32R and a mirror 336 reflecting the radiation 32G onto the dichroic mirror. The second set of mirrors 332 comprises a dichroic mirror 338 arranged in the beam path of the radiation 32R and a mirror 340 reflecting the radiation 32B onto the dichroic mirror 338.

This means that due to the two dichroic mirrors 333 and 338, the radiation 32R, 32G and 32B is combined to form the radiation 32V which impinges on the polygonal mirror 130 designed in accordance with the fifth or sixth embodiment and is reflected from there onto the image plane 14 in a manner already described in conjunction with the second embodiment. The advantage of this optical projection means 328 is to be seen in the fact that in this embodiment the partial image spots 336, generated by projection of the exit spots 30 of the semiconductor emitters 20R, 20G and 20B, can be superimposed on one another essentially congruently in each image spot 334.

Figure 20:
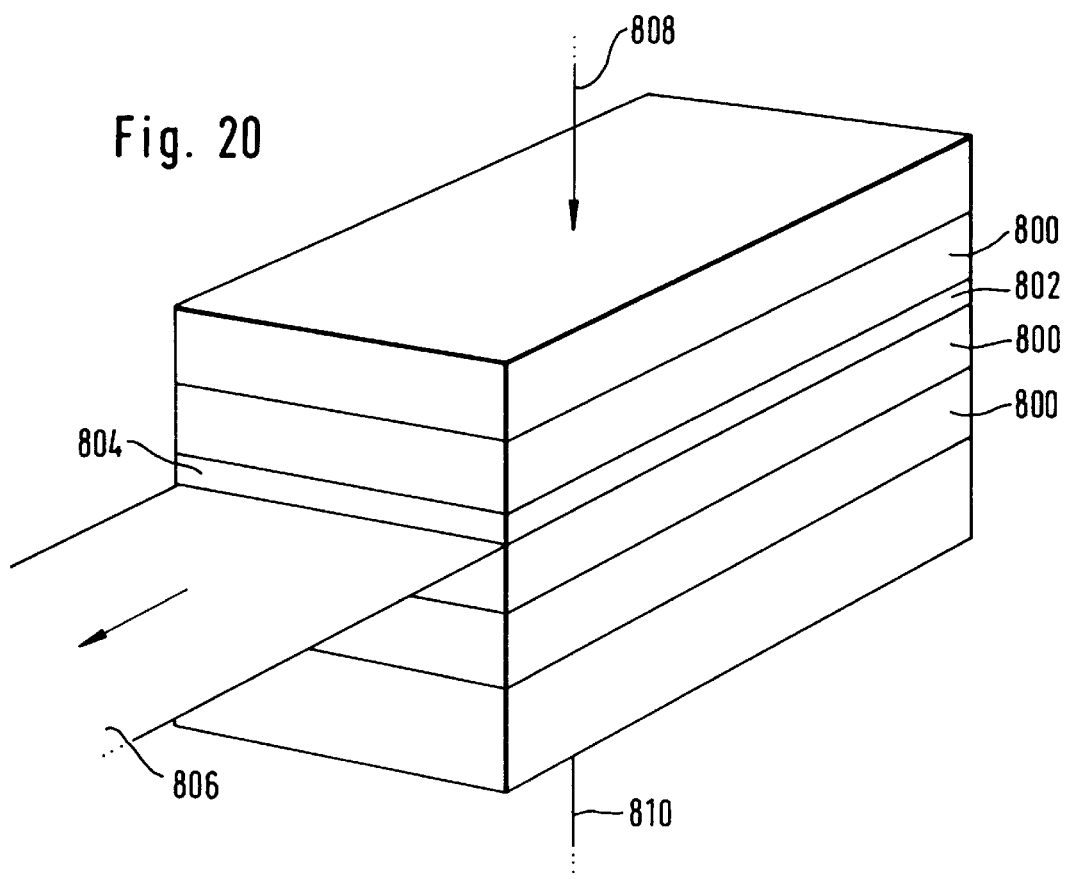
FIG. 20 is a schematic illustration of a semiconductor emitter designed as an edge emitter.

In all the embodiments of the inventive apparatus described in the above, the semiconductor emitters preferably comprise, as radiation sources, semiconductor lasers designed as so-called edge emitters, as illustrated schematically in FIG. 20. Edge emitters of this type consist of a plurality of semiconductor layers 800, between which a laser-active layer 802 is arranged. The laser radiation 806 exits from this laser-active layer in the region of an exit spot 804.

An edge emitter of this type is operated by a current supply via two current connections 808 and 810, whereby the current flows essentially perpendicular to the layers 800 and 802.

Examples of such edge emitters are described in detail in the periodical Laser Focus World, July 1993, Vol. 29, No. 7, pages 83 to 92.

The advantage of these edge emitters is to be seen in the fact that these can be produced in a simple manner, adjacently located in rows as a so-called array on a substrate.

Figure 21:
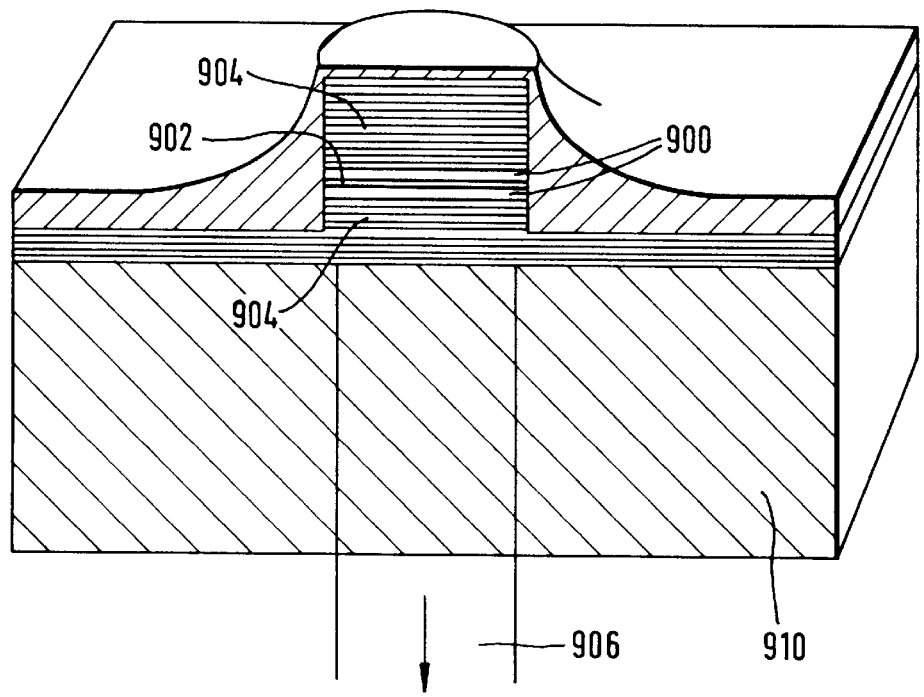
FIG. 21 is a schematic illustration of a semiconductor emitter designed as a vertical emitter.

Alternatively to providing edge emitters, it is possible to provide, as radiation sources, semiconductor lasers in the form of so-called vertical emitters, as illustrated in FIG. 21, whereby a laser-active layer 902 is likewise provided in vertical emitters of this type between a plurality of semiconductor layers 900 and additional layers 904 serving as Bragg reflectors are provided on both sides of the laser-active layer 902.

In vertical emitters of this type, the resulting laser radiation does not propagate as in the edge emitter parallel to the active layer 802 but at right angles to the active layer 902, passes through the substrate 910 and preferably exits vertically to the plane of the substrate 910.

Vertical emitters have the advantage that the resulting laser radiation 906 has an approximately circular cross section and, therefore, coupling to further, optical elements, for example fiber optic elements, is possible in a simple manner.

Vertical emitters of this type are, for example, described in the periodical Optics Letters, Vol. 18, No. 22, pages 1937 et seq. or in the periodical Spektrum der Wissenschaft, January 1992, pages 76 et seq. Reference is made in full to this description.

The following laser materials are preferably used as laser materials for the generation of radiation of different colors in the visible range:

| | | |
|---|---|---|
| $Al_xGa_yIn_{1-x-y}P$ on GaAs | for 610–690 nm | red |
| $Zn_{1-x}Mg_xS_{1-y}Se_y$ on GaAs | for 450–550 nm | blue, green |
| $Al_xGa_yIn_{1-x-y}N$ | for | UV-red |

Alternatively thereto, it is possible to use other, previously known laser materials and to double the wavelength of the light generated. Materials of this type would be, for example,

| | | | |
|---|---|---|---|
| $Al_xGa_{1-x}As$ | on GaAs | (780–880 nm) | for blue |
| $In_xGa_{1-x}As$ | on GaAs | (880–1100 nm) | for blue, green |
| $In_{1-x}Ga_xAs_yP_{1-y}$ | on InP | (1100–1600 nm) | for red. |

Figure 22:
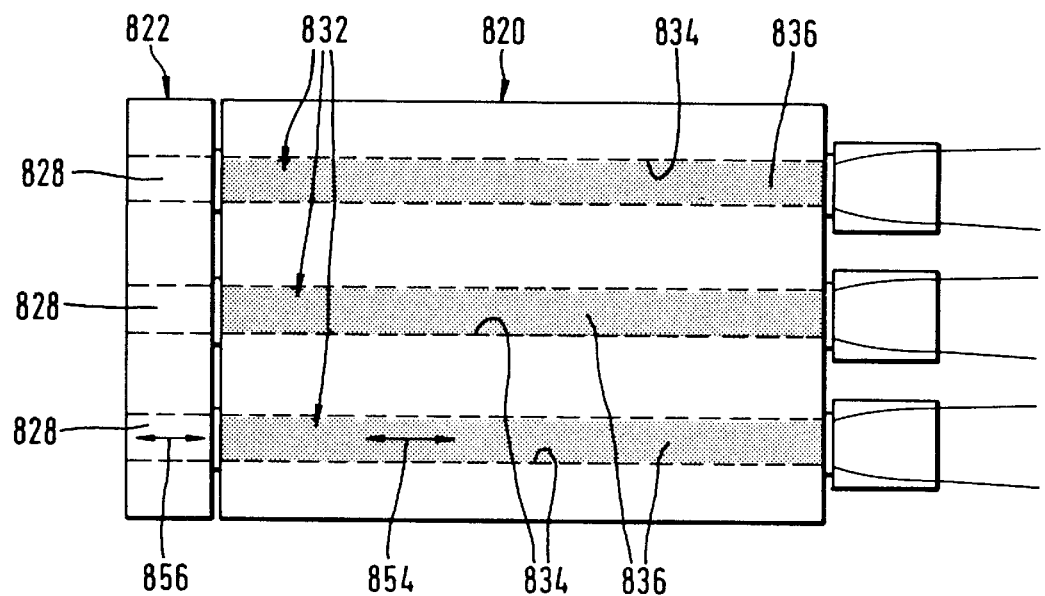
FIG. 22 is a plan view of a first embodiment of an array consisting of semiconductor emitters comprising radiation sources and subsequent frequency doublers.
Figure 23:
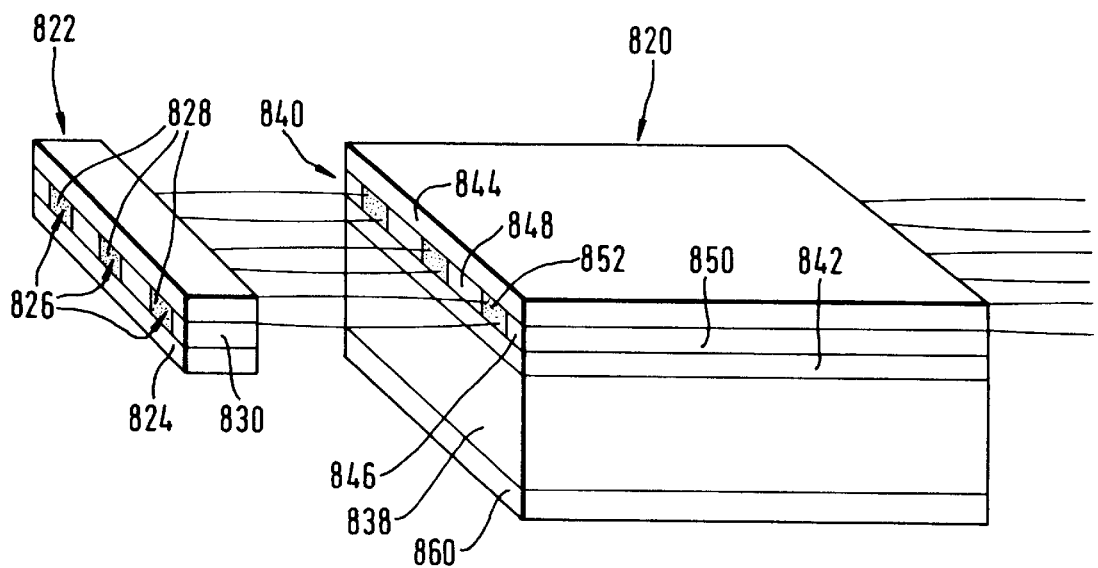
FIG. 23 is a perspective, exploded illustration of the array of radiation sources and the array of frequency doublers according to FIG. 22.

An embodiment of such semiconductor emitters 20' doubling the wavelength of the radiation from the radiation source, illustrated in FIGS. 22 and 23 in the form of a section from the row of light sources 820, comprises an array 822 of edge emitters 825 which are arranged on a common substrate 824, are formed by special, laser-active layers arranged on the common substrate 824 and each have, as laser-active layer 802, a strip-like region 828 of a continuous layer 830 arranged on the common substrate 824.

Each of the semiconductor lasers 826 serving as radiation source has a respective frequency doubler 832 associated with it, which comprises a respective waveguide structure 834, in which a frequency doubling medium is arranged as waveguide channel 836.

The waveguide structure 834 thereby guides the radiation generated by the respective semiconductor laser 826 in such a narrowed cross section that a power density of at least $10^5$ W/cm$^2$, preferably at least $10^6$ W/cm$^2$, which is required for an efficient frequency doubling in the frequency doubling medium, is achieved.

In the embodiment illustrated in FIGS. 22 and 23, all the frequency doublers 832 are likewise arranged on a common substrate 838 in the form of an array 840.

The waveguide structure 834 is thereby formed by a base layer 842 as well as a cover layer 844 which represent upper and lower walls of the waveguide channel 834, as well as strip regions 846 and 848 of an intermediate layer 850 which are in spaced relation to one another, form side walls of the waveguide channel 834 and enclose between them a strip region 852 of the intermediate layer 850 which forms the frequency doubling medium 836 serving as waveguide core.

The base layer 842, the cover layer 844 as well as the strip-like regions 846 and 848 of the intermediate layer 850 have a refractive index which is smaller than the refractive index of the strip-like region 852 so that a total reflection of the radiation and, thus, the guidance of the radiation in the waveguide structure 834 results at the boundaries between the strip-like region 852 and the layers 842 as well as 844 as well as the strip-like regions 846 and 848.

The semiconductor emitters 20' are preferably constructed such that the array 822 of semiconductor lasers 826 is directly followed by the array 840 of frequency doublers 832 so that the radiation from the laser-active layers 828 passes directly into the waveguide channels 834.

It is expedient for the extension of the waveguide structures 834 transversely to their longitudinal direction 854 to be selected to be approximately equal to the extension of the laser-active regions 828 in the direction of propagation 856 of the laser radiation.

In order to obtain an efficient frequency doubling in the frequency doubling medium 836, the basic wave, i.e. the radiation coming from the corresponding semiconductor laser 826, and the doubled radiation must remain in phase during their entire passage through the frequency doubling medium. This is achieved in an optimum manner when an uncritical or non-critical phase matching is used, in which the angle is 0° or 90°.

This is possible only at a few wavelengths. The respective material is preferably matched to the corresponding wavelength by a variation of the temperature so that, for example, the substrate 838 is seated on a temperature regulating device 860, with which the entire array 840 of frequency doublers 832 can be brought to the optimum temperature for the uncritical phase matching and kept at this temperature.

The uncritical or non-critical phase matching is described in detail in the book by W. Koechner "Solid State Laser Engineering" and so in this respect reference can be made in full to the contents of this literature.

The temperature regulating device 860 is preferably provided with a control, via which a predetermined temperature can be set and maintained by readjustment.

The direction of the crystals in the frequency doubling medium 836 is expediently predetermined by the alignment of the substrate 838 which is oriented such that the optical axis of the substrate is aligned in the desired direction in relation to the longitudinal direction 854 of the waveguide channel 834. If the layers 842, 844 and 850 are allowed to grow onto this substrate 838 from the same basic material, if necessary with different dopings, these layers have the same alignment of their optical axes as the substrate 838 and, consequently, the position of the optical axes in the frequency doubling medium 836 can also be predetermined.

Figure 24:
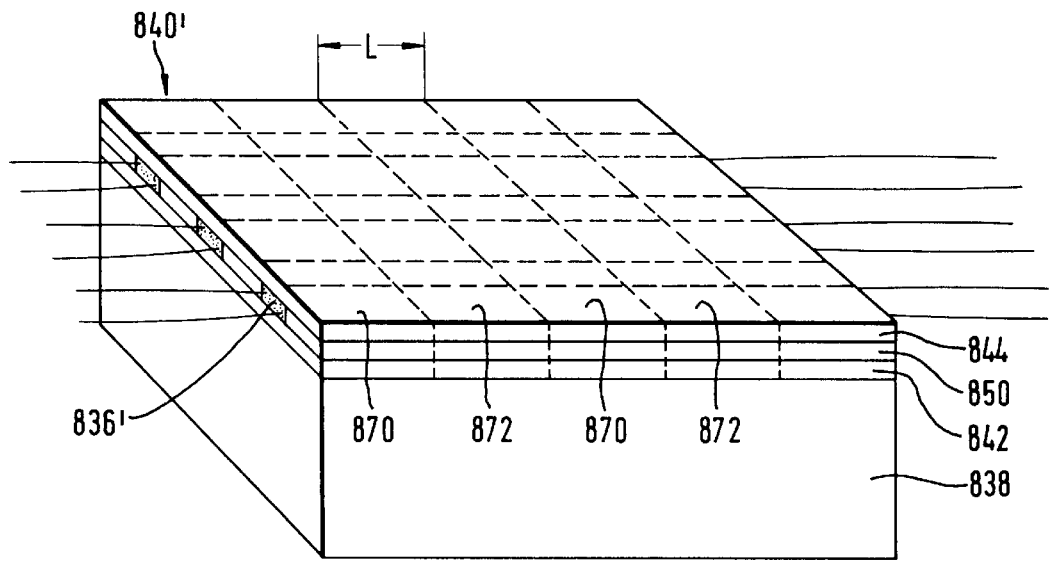
FIG. 24 is a variation of the array of frequency doublers according to FIG. 22.

A variation 840' of the array 840 of frequency doublers 832, illustrated in FIG. 24, does not use an uncritical phase matching but, rather, the phase matching is achieved by having domains 870 and 872, in which the non-linear coefficients of the frequency doubling medium 836 each have reversed signs, succeed one another in the frequency doubling medium 836'.

An extension L of the domains 870 and 872 in the longitudinal direction 854 of the waveguide channels 834 is to be coordinated such that it corresponds to the coherence length.

With a quasi-phase matching of this type, a phase matching during frequency doubling, which ensures an adequate intensity of the frequency doubled radiation, can be achieved outside the ideal phase matching.

The quasi-phase matching is described in detail in the periodical Optics Letters Vol. 17, No. 11, pages 795 to 797, in the periodical Applied Physics Letters 56 (2), pages 108 to 110 or in the IEEE Journal of Quantum Electronics, Vol. 28, No. 11, pages 2631 to 2654.

As for the rest, the array 840' is of the same design as the array 840 and so reference can be made in full to the relevant comments and the same reference numerals are also used for the same elements.

In the case of the uncritical phase matching, a crystal consisting of lithium niobate is preferably used as frequency doubling medium for the wavelengths green and red and a crystal consisting of potassium niobate for the wavelength blue.

The waveguide structure 834 is produced in that the material surrounding the waveguide core is lithium niobate or potassium niobate which has been doped additionally with magnesium or other elements lowering the refractive index.

Figure 25:
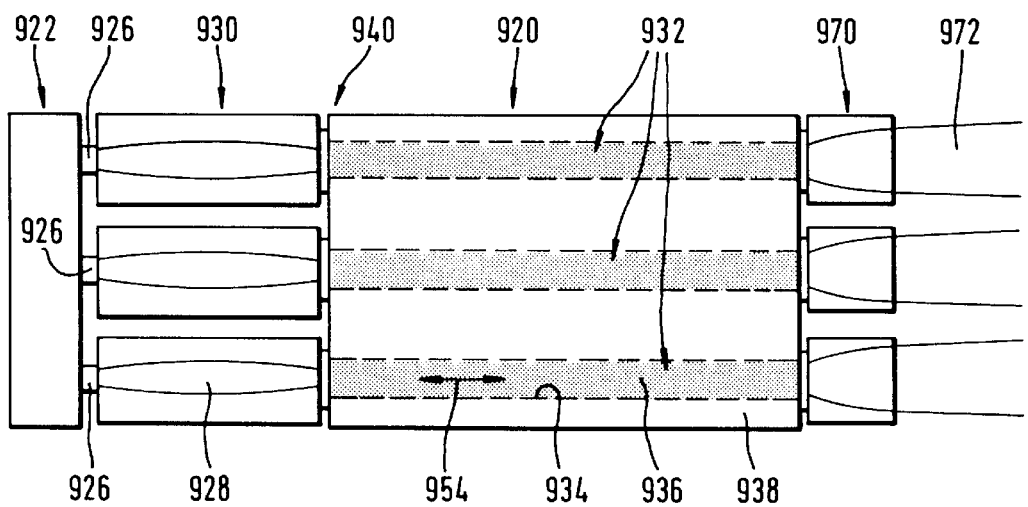
FIG. 25 is a second embodiment of an array of semiconductor emitters, formed from radiation sources and frequency doublers as well as an optical means arranged therebetween.
Figure 26:
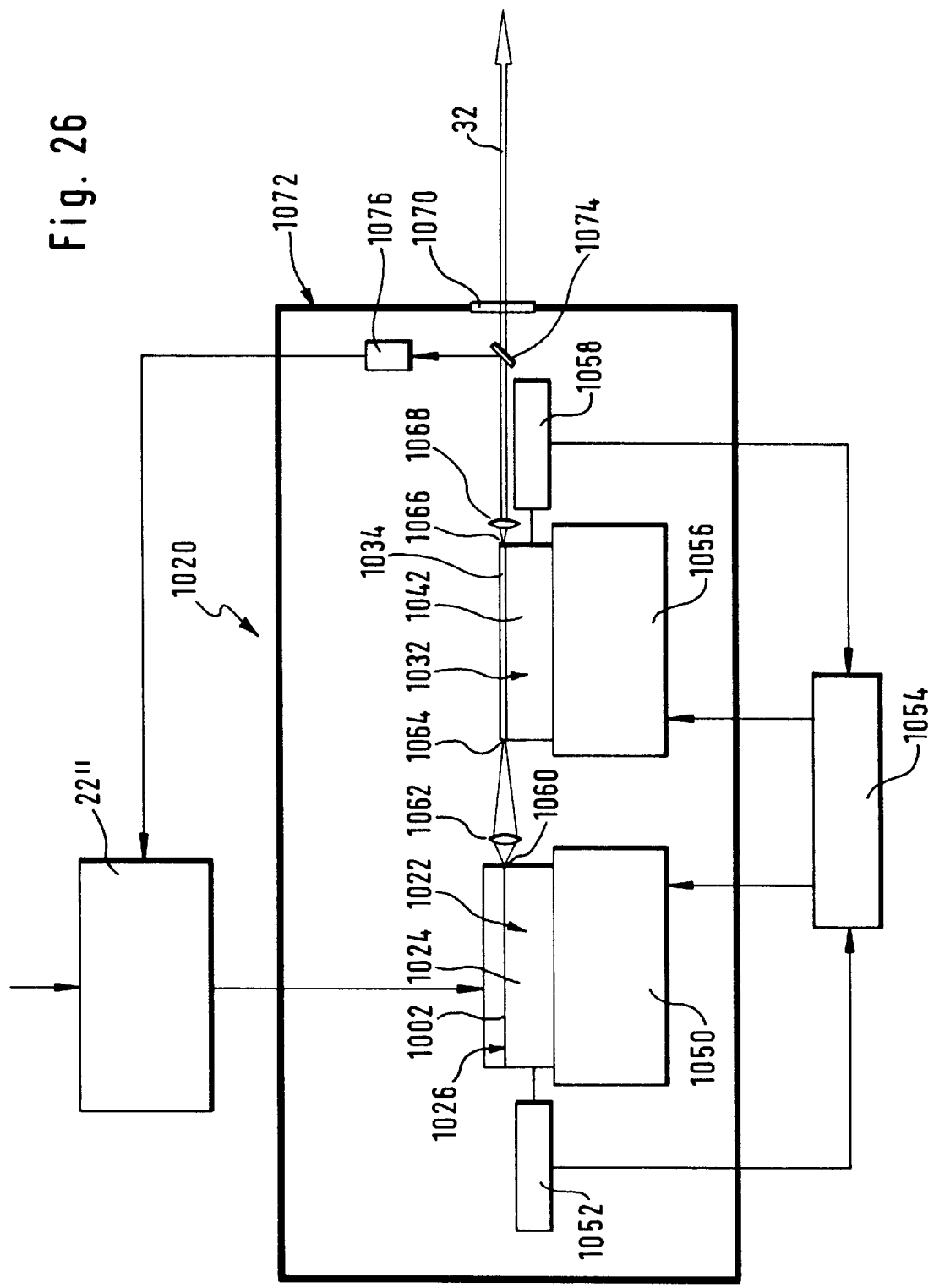

In a second embodiment of several inventive semiconductor emitters 20' combined to form a row of light sources 920 and illustrated in FIG. 25, an array 922 of semiconductor lasers 926 designed as vertical emitters is used. The radiation 928 from these semiconductor emitters is focused by focusing elements 930 onto frequency doublers 932 which are likewise arranged in an array 940 on a common substrate and are designed and constructed in the same way as the array 840 so that reference can be made in full to the relevant comments. The optical focusing means 930 is not designed as an optical lens means but as graded index lenses which are inserted as a block between the respective semiconductor lasers 926 and the corresponding frequency doublers 932 and due to the graded index focus the radiation 928 onto the waveguide channels 934.

Moreover, optical expansion means 970 are preferably arranged at the end faces of the frequency doublers 932 and these optical expansion means are likewise graded index lenses which generate an essentially parallel beam bundle 972.

In a third embodiment of several inventive semiconductor emitters combined to form a row of light sources 1020, an array 1022 of individual semiconductor lasers 1026 designed as edge emitters is arranged on the common substrate 1024, whereby individual laser-active layers are formed on the common substrate 1024 and these layers each have as laser-active layer 1002 a strip-like region on a continuous layer arranged on the common substrate 1024.

The substrate 1024 is thereby seated on a cooling element 1050 and is thermally coupled to a temperature sensor 1052 which regulates the cooling element 1050 to a constant temperature via a temperature regulator 1054 so that, finally, the substrate 1024 of the semiconductor emitters 1026 also has a constant temperature.

In the same way, a cooling element 1056 is provided for the frequency doubler 1032, whereby the basic layer 1042 is cooled by the cooling element 1056. In addition, a temperature sensor 1058 is coupled to this basic layer 1042 and this sensor likewise again creates the possibility with the temperature regulation 1054 of setting a constant temperature for the basic layer 1042 so that, finally, a constant temperature is also present in the waveguide channel for the frequency doubling medium 1036.

The exit spots 1060 of the edge emitters 1026 are preferably projected via a lens system 1062 onto the entry spots 1064 of the waveguide structure and its exit spots 1066 are again shaped via a lens system 1068 to form the parallel radiation 32 leaving the respective semiconductor emitter 1020. The radiation thereby passes through a window 1070 in a housing 1072 which, for its part, comprises not only the array 1022 but also the entirety of the waveguide structures 1034 with the cooling elements 1050 and 1056 as well as the temperature sensors 1052 and 1058 and also the lenses 1062 and 1066.

In addition, a beam divider 1074 is provided in front of the exit window 1070 and this reflects part of the radiation passing through the outer window 1070 onto a row of monitor photodiodes 1076 which is likewise arranged in the housing 1072 and has a monitor photodiode for each of the edge emitters 1026. All the monitor photodiodes are coupled to the control 22' which has already been described in detail in conjunction with the third embodiment of the inventive control according to FIG. 6.

In this respect, it is particularly advantageous for the lens systems 1062 and 1068, as illustrated in FIG. 27, to each comprise microlens systems which shape the radiation and are likewise arranged on a substrate. In addition, the waveguide structure of the frequency doubler 1032 is illustrated once more on an enlarged scale in FIG. 27.

The present disclosure relates to the subject matter disclosed in German application No. P 44 28 202.8 of Aug. 9, 1994, the entire specification of which is incorporated herein by reference.

What is claimed is:

1. An apparatus for generating an image formed by image spots in an image plane that is visible, in particular, for a human eye, comprising:

a radiation source and an optical projection means for generating said image by building up at least one row of image spots in said image plane during an image build-up cycle by illumination of individual, adjacently located image spots and periodically repeating the image build-up cycle;

said radiation source comprising at least one row of light sources;

said at least one row of light sources comprising a plurality of semiconductor emitters having respective exit spots;

said optical projection means simultaneously imaging said exit spots of all the semiconductor emitters of said row of light sources onto said image spots associated therewith by associating adjacently located exit spots of the row of light sources onto a series of image spots arranged as an image spot pattern;

wherein adjacent image spots of said image spot pattern are arranged in an image spot pattern spacing which amounts to a specific multiple of a distance between adjacently located image spots of the row of image spots.

2. An apparatus as defined in claim 1, wherein:

the image spot pattern spacing is an integral multiple of the distance between adjacently located image spots of the row of image spots.

3. An apparatus as defined in claim 1, wherein:

the apparatus comprises an optical spreading means imaging the distance between adjacently located exit spots of the row of light sources onto a pattern spacing resulting in the image spot pattern spacing in the image following projection by the optical projection means.

4. An apparatus as defined in claim 1, wherein:

the optical spreading means enlarges the distance between adjacently located exit spots of the row of light sources to the pattern spacing.

5. An apparatus as defined in claim 3, wherein:

the optical spreading means images the radiation exiting from the exit spots onto parallel beam bundles extending in the pattern spacing relative to one another.

6. An apparatus as defined in claim 3, wherein:

the optical spreading means comprises a plurality of prism elements and the prism elements generate beam bundles exiting from the optical spreading means, said beam bundles having said image spot pattern spacing.

7. An apparatus as defined in claim 3, wherein:

the optical spreading means comprises a reflection grating, the reflection surfaces thereof having the specific pattern spacing in the direction of incidence of the radiation coming from the semiconductor emitters.

8. An apparatus as defined in claim 7, wherein:

the optical spreading means comprises a light guide for each of the exit spots and the radiation from the respective exit spots of the semiconductor emitters enters the light guides at one end and the light guides define with the other end light guide exit spots arranged in the predetermined pattern spacing.

9. An apparatus as defined in claim 8, wherein:

light guide paths arranged on a substrate are provided as light guides for the optical spreading means.

10. An apparatus as defined in claim 1, wherein:

the optical projection means also associates different exit spots with different image spots of the row of image spots during the image build-up cycle.

11. An apparatus as defined in claim 1, wherein:

the optical projection means associates the same exit spots with the same image spots of the row of image spots during each image build-up cycle.

12. An apparatus as defined in claim 1, wherein:

the number of semiconductor emitters is smaller than the total number of image spots of the row of image spots and the optical projection means images the exit spots onto various series of image spots of the row of image spots at consecutive points of time during the image build-up cycle.

13. An apparatus as defined in claim 12, wherein:

the optical projection means images the exit spots of the row of light sources onto a respective series of image spots of the row of image spots at each of the consecutive points of time during the image build-up cycle and the series of image spots is formed by a set of immediately adjacent image spots.

14. An apparatus as defined in claim 13, wherein:

after termination of one of the image build-up cycles the entirety of the sets of image spots comprise all the image spots of the row of image spots, whereby each image spot of the row of image spots is respectively comprised by one set of image spots.

15. An apparatus as defined in claim 13, wherein:

the optical projection means places the sets of image spots in the row of image spots such that chronological sets of image spots immediately follow one another.

16. An apparatus as defined in claim 1, wherein:

for generating the row of image spots, the optical projection means images the radiation coming from the row of light sources successively onto various series of image spots one after the other.

17. An apparatus as defined in claim 16, wherein:

the optical projection means comprises a beam deflecting element imaging the radiation coming from the row of light sources onto the consecutive series of image spots.

18. An apparatus as defined in claim 17, wherein:

the beam deflecting element is a movable reflection element.

19. An apparatus as defined in claim 18, wherein:

the reflection element is movable into defined angular positions imaging the radiation coming from the row of light sources onto a respective one of the series of image spots.

20. An apparatus as defined in claim 19, wherein:

the beam deflecting element is formed by a mirror pivotable about an axis.

21. An apparatus as defined in claim 20, wherein:

the mirror moves continuously during the image build-up cycle.

22. An apparatus as defined in claim 20, wherein:

the mirror passes through individual, defined positions during the image build-up cycle.

23. An apparatus as defined in claim 1, wherein:

the optical projection means builds up the image from a plurality of adjacently located rows of image spots during the image build-up cycle.

24. An apparatus as defined in claim 23, wherein:

the optical projection means generates the image spots of one series of image spots in each row of image spots and then generates the next series of image spots in each row of image spots.

25. An apparatus as defined in claim 23, wherein:

the optical projection means comprises a beam deflecting element generating the series of image spots in the consecutive rows of image spots.

26. An apparatus as defined in claim 25, wherein:

the beam deflecting element is a movable reflection element.

27. An apparatus as defined in claim 26, wherein:

the reflection element is movable into defined angular positions generating the series of image spots in each of the rows of image spots.

28. An apparatus as defined in claim 17, wherein:

the beam deflecting element is formed by a polygonal mirror rotating about an axis of rotation.

29. An apparatus as defined in claim 28, wherein:

the polygonal mirror reflects the radiation coming from the row of light sources with each polygonal surface such that this radiation traverses the number of adjacently located rows of image spots by rotation in a predetermined angular range and then proceeds to the next polygonal surface.

30. An apparatus as defined in claim 28, wherein:

the polygonal mirror has mirror surfaces respectively inclined by a different angle in relation to a parallel line to the axis of rotation such that each mirror surface generates a series of image spots in all the rows of image spots of the image.

31. An apparatus as defined in claim 17, wherein:

the optical projection means focuses the radiation from the semiconductor emitters of the row of light sources essentially onto the beam deflecting element.

32. An apparatus as defined in claim 1, wherein:

the optical projection means generates image spots having small distances between one another.

33. An apparatus as defined in claim 32, wherein:

the image spots border essentially on one another.

34. An apparatus as defined in claim 1, wherein:

the semiconductor emitters emit the radiation in the period of time between two consecutive control points of time ($t_1$, $t_2$ ... ).

35. An apparatus as defined in claim 34, wherein:

the control points of time ($t_1$, $t_2$ ... ) succeed one another at constant time intervals.

36. An apparatus as defined in claim 31, wherein:

the semiconductor emitters emit the radiation with a variably adjustable intensity.

37. An apparatus as defined in claim 36, wherein:

the semiconductor emitters emit the radiation with the adjusted intensity essentially unaltered between two control points of time ($t_1$, $t_2$ ... ).

38. An apparatus as defined in claim 36, wherein:

the intensity of the radiation of each semiconductor emitter is adjusted at each control point of time ($t_1$, $t_2$ ... ).

39. An apparatus as defined in claim 34, wherein:

the semiconductor emitters emit between the control points of time ($t_1$, $t_2$ ... ) either radiation with a maximum intensity but a variable adjustable duration ($\Delta t_1$, $\Delta t_2$ ... ) or no radiation.

40. An apparatus as defined in claim 39, wherein:

an average intensity perceived by an observer is adjusted by modulating the duration ($\Delta t_1$, $\Delta t_2$ ... ) of the emission of the radiation.

41. An apparatus as defined in claim 39, wherein:

the duration ($\Delta t_1$, $\Delta t_2$ ...) of the emission of the radiation is adjusted at each control point of time ($t_1$, $t_2$ ... ).

42. An apparatus as defined in claim 1, wherein:

each image spot is adapted to be illuminated by a single semiconductor emitter.

43. An apparatus as defined in claim 1, wherein:

each image spot is adapted to be illuminated by three semiconductor emitters, each of said emitters emitting radiation at such a wavelength that white light is generated by superimposing the radiation from the three semiconductor emitters.

44. An apparatus as defined in claim 43, wherein:

the optical projection means combines the radiation of the three semiconductor emitters radiating at different wavelengths to form a beam bundle.

45. An apparatus as defined in claim 44, wherein:

the three semiconductor emitters respectively illuminating one image spot are adapted to be controlled simultaneously.

46. An apparatus as defined in claim 1, wherein:

the row of light sources has at least one row of semiconductor emitters emitting radiation of the same wavelength.

47. An apparatus as defined in claim 46, wherein:

for illuminating the image spots of one row of image spots the corresponding row of light sources comprises three rows of semiconductor emitters extending parallel to one another, wherein the semiconductor emitters of each row emit radiation of essentially the same wavelength.

48. An apparatus as defined in claim 1, wherein:

an intermediate store is provided for the simultaneous control of several semiconductor emitters, the control parameters for simultaneously controlling the several semiconductor emitters being read out in parallel from said store.

49. An apparatus as defined in claim 1, wherein:

one of the semiconductor emitters comprises a semiconductor radiation source and a frequency doubler for the radiation emitted by the semiconductor radiation source.

50. An apparatus as defined in claim 49, wherein:

the frequency doubler comprises a waveguide structure guiding the radiation from each radiation source in a compressed manner with a power density of at least $10^5$ W/cm$^2$ and a frequency doubling medium arranged in the waveguide structure.

51. An apparatus as defined in claim 49, wherein:

the frequency doublers directly follow the radiation sources.

52. An apparatus as defined in claim 49, wherein:

an optical means focusing the radiation into the waveguide structure is arranged between each radiation source and each frequency doubler.

53. An apparatus as defined in claim 49, wherein:

the radiation sources of a row of light sources are arranged in a row and the frequency doublers of the row of light sources are likewise arranged in a row on the output side of the radiation sources.

54. An apparatus as defined in claim 49, wherein:

several of the radiation sources are arranged on a common substrate.

55. An apparatus as defined in claim 49, wherein:

several of the frequency doublers are arranged on a common substrate.

56. An apparatus as defined in claim 49, wherein:

each waveguide structure of each frequency doubler is a "single mode" waveguide.

57. An apparatus as defined in claim 49, wherein:

each waveguide structure is formed by a wall material surrounding the frequency doubling medium forming the waveguide core and having a lower refractive index than the waveguide core.

58. An apparatus as defined in claim 57, wherein:

the wall material is based on the same material as the frequency doubling medium and has a lower refractive index than the frequency doubling medium due to a different doping.

59. An apparatus as defined in claim 57, wherein:

the waveguide structure is formed by doping of regions forming the wall material in a material identical to the frequency doubling medium.

60. An apparatus as defined in claim 49, wherein:

the waveguide structure is formed by layers applied to a substrate and comprising the wall material.

61. An apparatus as defined in claim 49, wherein:

the frequency doubling medium is formed by a layer applied to a substrate.

62. An apparatus as defined in claim 61, wherein:

a defined alignment of crystallographic axes of the frequency doubling medium is predetermined by alignment of the substrate.

63. An apparatus as defined in claim 50, wherein:

the frequency doubling medium is designed and with respect to its optical axis is aligned in relation to the waveguide channel such that an uncritical phase matching results between the radiation and the doubled radiation in a longitudinal direction of the waveguide structure.

64. An apparatus as defined in claim 63, wherein:

the frequency doubling medium is adapted to be brought to a defined temperature.

65. An apparatus as defined in claim 50, wherein:

the frequency doubling medium is designed and aligned such that a quasi-phase matching results in a longitudinal direction of the waveguide structure.

66. An apparatus as defined in claim 1, wherein:

a plurality of rows of light sources are provided; and said optical projection means images each of the plurality of rows of light sources onto a different corresponding row of image spots of said image spot pattern.

* * * * *